US012724243B2

(12) United States Patent
Zhou et al.

(10) Patent No.: US 12,724,243 B2
(45) Date of Patent: Sep. 1, 2026

(54) CAMERA OPTICAL LENS AND LENS ASSEMBLY

(71) Applicant: Changzhou AAC Raytech Optronics Co., Ltd., Changzhou City (CN)

(72) Inventors: Shunda Zhou, Changzhou (CN); Congfang Si, Changzhou (CN); Wei Sun, Changzhou (CN)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 226 days.

(21) Appl. No.: 18/791,403

(22) Filed: Jul. 31, 2024

(65) Prior Publication Data

US 2025/0314859 A1 Oct. 9, 2025

(30) Foreign Application Priority Data

Apr. 8, 2024 (CN) ......................... 202410417447.2

(51) Int. Cl.
*G02B 13/00* (2006.01)
*G02B 9/64* (2006.01)
*G02B 13/06* (2006.01)

(52) U.S. Cl.
CPC ........... *G02B 13/0045* (2013.01); *G02B 9/64* (2013.01); *G02B 13/06* (2013.01)

(58) Field of Classification Search
CPC .............................. G02B 13/0045; G02B 9/64
See application file for complete search history.

(56) References Cited

U.S. PATENT DOCUMENTS

2022/0057607 A1* 2/2022 Zhang ...................... G02B 9/64
2022/0397742 A1* 12/2022 Zhang ................ G02B 13/0045

* cited by examiner

*Primary Examiner* — Alexander P Gross
(74) *Attorney, Agent, or Firm* — Viersch Law Group

(57) ABSTRACT

The present disclosure relates to the field of optical lenses, and discloses a camera optical lens and a lens assembly sequentially including seven lenses from an object side to an image side: a first lens having a positive refractive power, a second lens having a negative refractive power, a third lens having a negative refractive power, a fourth lens having a positive refractive power, a fifth lens having a negative refractive power, a sixth lens having a positive refractive power, a seventh lens having a negative refractive power, and the camera optical lens further includes an aperture; and following relational expressions are satisfied:—

$$8.00 \leq (SAG51/SD51 * R9)/(SAG72/SD72 * R14) \leq -3.30;$$

$$0.80 \leq HC71/SD71 \leq 0.95;$$

$$0.85 \leq HC72/SD72 \leq 0.97; \text{ and}$$

$$1.10 \leq (d10 + d12)/d11 \leq 2.10.$$

30 Claims, 19 Drawing Sheets

CAMERA OPTICAL LENS AND LENS ASSEMBLY

TECHNICAL FIELD

The present disclosure relates to the field of optical lens and, in particular, to a camera optical lens and a lens assembly applicable to handheld terminal devices such as smart phones, digital cameras, and camera devices such as monitors and PC lenses, vehicle-mounted lenses.

BACKGROUND

In recent years, with the rise of various smart devices, the demand for a miniaturized camera optical lens has gradually increased, and since the pixel size of the optical sensor is reduced, and the current electronic product has a development trend of light weight, thin and portable, the miniaturized camera optical lens with good imaging quality has become the mainstream of the current market. In order to obtain better imaging quality, a multi-lens structure is mostly used. In addition, with the development of technology and the increase of diversified requirements of users, under the condition that the pixel area of the optical sensor is continuously reduced and the requirements on the imaging quality of the system are continuously improved, the structure with seven lenses gradually appears in the lens design. There is an urgent need for a camera lens with high relative illumination, wide angle and good processability.

SUMMARY

In view of the problems, the present disclosure aims to provide a camera lens, which can achieve a high optical performance while satisfying design requirements for ultra-thinness, wide angle lenses having a big aperture. In view of the above problems, an object of the present disclosure is to provide a camera optical lens having design requirements of high relative illumination, wide angle and good processibility.

In order to achieve the above object, a first aspect of the present disclosure provides a camera optical lens. The camera optical lens sequentially includes seven lenses from an object side to an image side: a first lens having positive refractive power, a second lens having negative refractive power, a third lens having negative refractive power, a fourth lens having positive refractive power, a fifth lens having negative refractive power, a sixth lens having positive refractive power, and a seventh lens having negative refractive power. The camera optical lens further includes an aperture; an object-side surface of the first lens is convex in a paraxial region, an image-side surface of the first lens is concave in the paraxial region, an object-side surface of the second lens is convex in the paraxial region, an image-side surface of the second lens is concave in the paraxial region, an object-side surface of the third lens is convex in the paraxial region, an image-side surface of the third lens is concave in the paraxial region, an object-side surface of the fourth lens is convex in the paraxial region, an object-side surface of the fifth lens is concave in the paraxial region, an image-side surface of the fifth lens is concave in the paraxial region, an object-side surface of the sixth lens is convex in the paraxial region, an image-side surface of the sixth lens is concave in the paraxial region, an object-side surface of the seventh lens is convex in the paraxial region, and an image-side surface of the seventh lens is concave in the paraxial region. A maximum optical radius of the object-side surface of the fifth lens is defined as SD51, a sagittal height at the maximum optical radius of the object-side surface of the fifth lens is defined as SAG51, a maximum optical radius of the image-side surface of the seventh lens is defined as SD72, a sagittal height at the maximum optical radius of the image-side surface of the seventh lens is defined as SAG72, a central curvature radius of the object-side surface of the fifth lens in the paraxial region is defined as R9, a central curvature radius of the image-side surface of the seventh lens in the paraxial region is defined as R14, a vertical height from the intersection point of the main light of the 1.0 field of view and the object-side surface of the seventh lens to the optical axis is defined as HC71, a maximum optical radius of the object-side surface of the seventh lens is defined as SD71, a vertical height from the intersection point of the main light of the 1.0 field of view and the image-side surface of the seventh lens to the optical axis is defined as HC72, a maximum optical radius of the image-side surface of the seventh lens is defined as SD72, an on-axis distance between the fifth lens and the sixth lens is d10, an on-axis distance between the sixth lens and the seventh lens is defined as d12, an on-axis thickness of the sixth lens is defined as d11, an on-axis distance between the third lens and the fourth lens is defined as d6, a total optical length from the object-side surface of the first lens to an image surface of the camera optical lens along an optic axis of the camera optical lens is defined as TTL, a focal length of the sixth lens is f6, a focal length of the seventh lens is defined as f7, a central curvature radius of the object-side surface of the first lens in the paraxial region is defined as R1, a central curvature radius of the image-side surface of the first lens in the paraxial region is defined as R2, and a focal length of the camera optical lens is defined as f, and following relational expressions are satisfied:

$$-8.00 \le (SAG51/SD51*R9)/(SAG72/SD72*R14) \le -3.30;$$

$$0.80 \le HC71/SD71 \le 0.95;$$

$$0.85 \le HC72/SD72 \le 0.97;$$

$$1.10 \le (d10+d12)/d11 \le 2.10;$$

$$0.007 \le d6/TTL \le 0.013;$$

$$-0.85 \le f6/f7 \le -0.45; \text{ and}$$

$$1.00 \le (R1+R2)/f \le 2.10.$$

As an improvement, a distance along the optical axis from the aperture to the center of the object-side surface of the first lens is defined as TEP, a sagittal height at the maximum optical radius of the object-side surface of the first lens is defined as SAG11, a focal length of the first lens is defined as f1, and a following relational expression is satisfied:

$$0.06 \le |TEP/SAG11|*(f/f1) \le 0.09.$$

As an improvement, a following relational expression is satisfied:

$$7.10 \le (SAG51/SD51*R9)/(SAG72/SD72*R14) \le -4.05.$$

As an improvement, a following relational expression is satisfied:

$$1.30 \leq (d10+d12)/d11 \leq 1.91.$$

As an improvement, a following relational expression is satisfied: $-0.76 \leq f6/f7 \geq -0.52$.

As an improvement, a following relational expression is satisfied:

$$1.15 \leq (R1+R2)/f \leq 1.85.$$

As an improvement, an on-axis distance between the first lens and the second lens is defined as d2, an on-axis distance between the fourth lens and the fifth lens is defined as d8, and a following relational expression is satisfied: $1.95 \leq d8/d2 \leq 4.05$.

As an improvement, a following relational expression is satisfied: $2.44 \leq d8/d2 \leq 3.40$.

As an improvement, the first lens is made of glass.

A second aspect of the present disclosure provides a camera optical lens. The camera optical lens sequentially includes seven lenses from an object side to an image side: a first lens having positive refractive power, a second lens having negative refractive power, a third lens having negative refractive power, a fourth lens having positive refractive power, a fifth lens having negative refractive power, a sixth lens having positive refractive power, a seventh lens having negative refractive power, and the camera optical lens further includes an aperture; an object-side surface of the first lens is convex in the paraxial region, an image-side surface of the first lens is concave in the paraxial region, an object-side surface of the second lens is convex in the paraxial region, an image-side surface of the second lens is concave in the paraxial region, an object-side surface of the third lens is convex in the paraxial region, an image-side surface of the third lens is concave in the paraxial region, an object-side surface of the fourth lens is convex in the paraxial region, an object-side surface of the fifth lens is concave in the paraxial region, an image-side surface of the fifth lens is concave in the paraxial region, an object-side surface of the sixth lens is convex in the paraxial region, an image-side surface of the sixth lens is concave in the paraxial region, an object-side surface of the seventh lens is convex in the paraxial region, an image-side surface of the seventh lens is concave in the paraxial region. A maximum optical radius of the object-side surface of the fifth lens is defined as SD51, a sagittal height at the maximum optical radius of the object-side surface of the fifth lens is defined as SAG51, a maximum optical radius of the image-side surface of the seventh lens is defined as SD72, a sagittal height at the maximum optical radius of the image-side surface of the seventh lens is defined as SAG72, a central curvature radius of the object-side surface of the fourth lens in the paraxial region is defined as R7, a central curvature radius of the object-side surface of the fifth lens in the paraxial region is defined as R9, a central curvature radius of the image-side surface of the seventh lens in the paraxial region is defined as R14, a vertical height from the intersection point of the main light of the 1.0 field of view and the object-side surface of the seventh lens to the optical axis is defined as HC71, a maximum optical radius of the object-side surface of the seventh lens is defined as SD71, a vertical height from the intersection point of the main light of the 1.0 field of view and the image-side surface of the seventh lens to the optical axis is defined as HC72, a maximum optical radius of the image-side surface of the seventh lens is defined as SD72, an on-axis distance between the fifth lens and the sixth lens is defined as d10, an on-axis distance between the sixth lens and the seventh lens is d12, an on-axis thickness of the sixth lens is defined as d11, a focal length of the first lens is defined as f1, a focal length of the second lens is defined as f2, a focal length of the third lens is defined as f3, a focal length of the fourth lens is defined as f4, a focal length of the fifth lens is defined as f5, a focal length of the camera optical lens is defined as f, a combined focal length of the first lens and the second lens is defined as f12, and following relational expressions are satisfied:

$$-8.00 \leq (SAG51/SD51*R9)/(SAG72/SD72*R14) \leq -3.30;$$

$$0.80 \leq HC71/SD71 \leq 0.95;$$

$$0.85 \leq HC72/SD72 \leq 0.97;$$

$$1.10 \leq (d10+d12)/d11 \leq 2.10;$$

$$-0.88 \leq f1/(f2-f3) \leq -0.05;$$

$$1.10 \leq f12/f \leq 1.60; \text{ and}$$

$$2.20 \leq f4/R7+f5/R9 \leq 3.80.$$

As an improvement, a following relational expression is satisfied: $-0.75 \leq f1/(f2-f3) \leq -0.06$.

As an improvement, a following relational expression is satisfied: $1.28 \leq f12/f \leq 1.36$.

As an improvement, a following relational expression is satisfied:

$$2.70 \leq f4/R7+f5/R9 \leq 3.20.$$

As an improvement, a following relational expression is satisfied:—

$$7.10 \leq (SAG51/SD51*R9)/(SAG72/SD72*R14) \leq -4.05.$$

As an improvement, a following relational expression is satisfied:

$$1.30 \leq (d10+d12)/d11 \leq 1.91.$$

As an improvement, a focal length of the sixth lens is defined as f6, a focal length of the seventh lens is defined as f7, and a following relational expression is satisfied:—

$$0.85 \leq f6/f7 \leq -0.45.$$

As an improvement, a following relational expression is satisfied: $-0.76 \leq f6/f7 \leq 0.52$.

As an improvement, a central curvature radius of the object-side surface of the first lens in the paraxial region is defined as R1, a central curvature radius of the image-side surface of the first lens in the paraxial region is defined as R2, a focal length of the camera optical lens is defined as f, and a following relational expression is satisfied: $1.00 \le (R1+R2)/f \le 2.10$.

As an improvement, a following relational expression is satisfied:

$$1.15 \le (R1+R2)/f \le 1.85.$$

As an improvement, a focal length of the sixth lens is f6, and a following relational expression is satisfied: $1.65 \le |f/f5|+|f/f6| \le 2.69$.

As an improvement, a following relational expression is satisfied:

$$1.96 \le |f/f5| + |f/f6| \le 2.28.$$

As an improvement, the first lens is made of glass.

A third aspect of the present disclosure provides a lens assembly. The lens assembly includes the camera optical lens as described in the first aspect above. Each of the first lens, the second lens, the third lens, the fourth lens, the fifth lens, the sixth lens and seventh lens includes an optical portion for imaging and a structural portion surrounding the optical portion, the second lens includes a second optical portion for imaging and a second structural portion surrounding the second optical portion, the third lens includes a third optical portion for imaging and a third structural portion surrounding the third optical portion, the second structural portion includes a first surface adjacent to an image side, the third structural portion includes a second surface adjacent to an object side, the first surface includes a first inclination surface adjacent to the second optical portion and a second inclination surface provided on a side of the first inclination surface away from the second optical portion, the second surface includes a third inclination surface adjacent to the third optical portion and a fourth inclination surface provided on a side of the third inclination surface away from the third optical portion, an angle between the first inclination surface and an optical axis is defined as ANG1, an angle between the fourth inclination surface and the optical axis is defined as ANG4, and a following relational expression is satisfied: $|ANG1-ANG4| \le 30°$.

24. The lens assembly as described in claim 23, wherein an angle between the second inclination surface and the optical axis is defined as ANG2, an angle between the third inclination surface and the optical axis is defined as ANG3, and a following relational expression is satisfied: $|ANG2-ANG3| \le 10°$.

As an improvement, the first inclination surface is inclined from inside to outside in a direction adjacent to the object side, a curvature radius of the image-side surface of the second lens in the paraxial region is defined as R4, a maximum optical radius of the image-side surface of the second lens is defined as SD22, and a following relational expression is satisfied:

$$3.00 \le R4/SD22 * \tan(ANG1) \le 5.00.$$

As an improvement, the third inclination surface is inclined from inside to outside in a direction adjacent to the image side, a curvature radius of the object-side surface of the third lens in the paraxial region is defined as R5, a maximum optical radius of the object-side surface of the third lens is defined as SD31, and a following relational expression is satisfied:

$$1.50 \le R5/SD31 * \cos(ANG3) \le 4.00.$$

The present disclosure has following beneficial effects: The camera optical lens has excellent optical characteristics of high relative illumination, wide angle and good processibility, and is particularly suitable for a mobile phone camera lens assembly, a WEB camera lens and a vehicle-mounted lens which are composed of camera elements such as CCD, CMOS with high definition.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

In order to more clearly illustrate objectives, technical solutions, and advantages of the embodiments of the present disclosure, the technical solutions in the embodiments of the present disclosure are clearly and completely described in details with reference to the drawings. The described embodiments are merely part of the embodiments of the present disclosure rather than all of the embodiments. All other embodiments obtained by those skilled in the art based on the embodiments of the present disclosure shall fall into the protection scope of the present disclosure.

Referring to FIGS. 1-32, the present disclosure provides camera optical lenses 10, 20, 30, 40, 50, 60, 70 and 80. FIG. 1, FIG. 5, FIG. 9, FIG. 13, FIG. 17, FIG. 21, FIG. 25 and FIG. 29 show camera optical lenses 10, 20, 30, 40, 50, 60, 70 and 80 according to the present disclosure. The camera optical lenses 10, 20, 30, 40, 50, 60, 70 and 80 each include seven lenses. The camera optical lens sequentially includes from an object side to an image side: an aperture; a first lens L1, a second lens L2, a third lens L3, a fourth lens L4, a fifth lens L5, a sixth lens L6 and a seventh lens L7. An optical element such as a grating filter may be provided between the seventh lens L7 and an image surface S1.

Figure 33:
FIG. 33 is a schematic structural diagram of a camera assembly according to the present disclosure.
Figure 33:
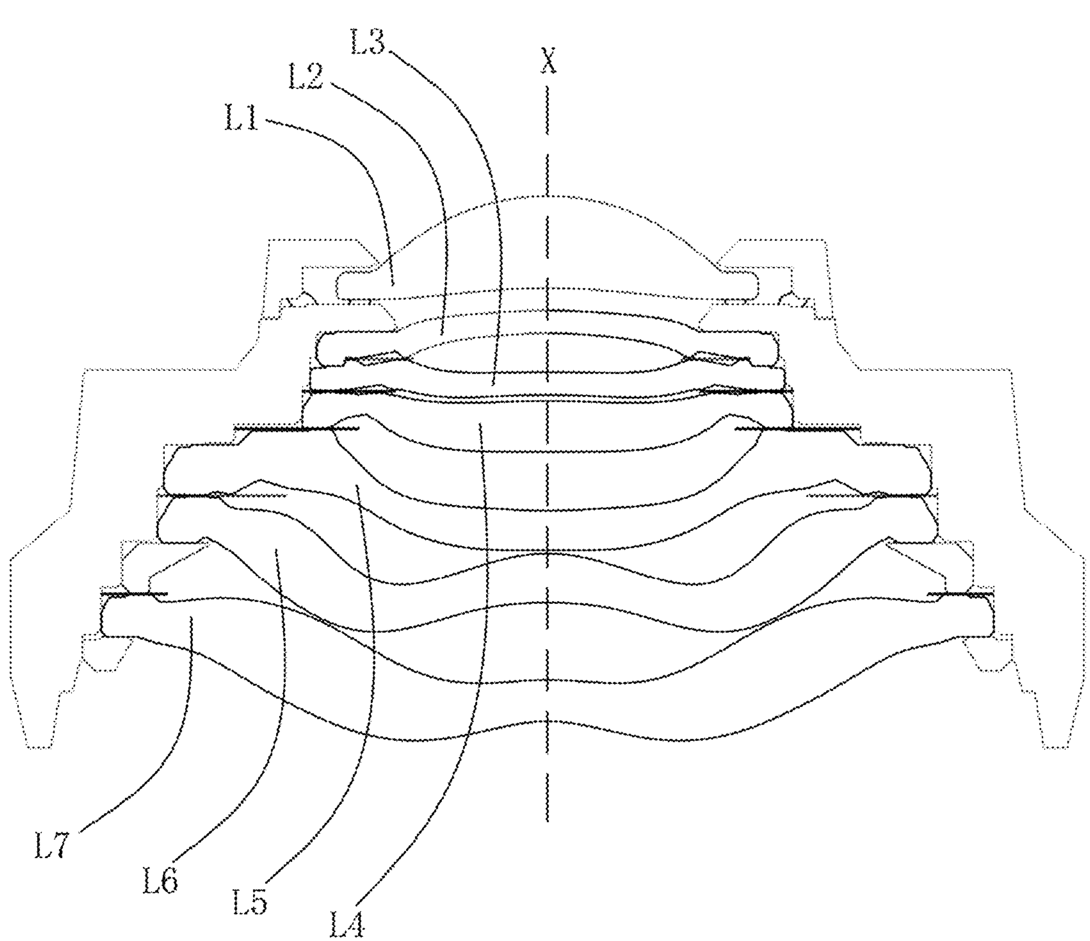
Figure 34:
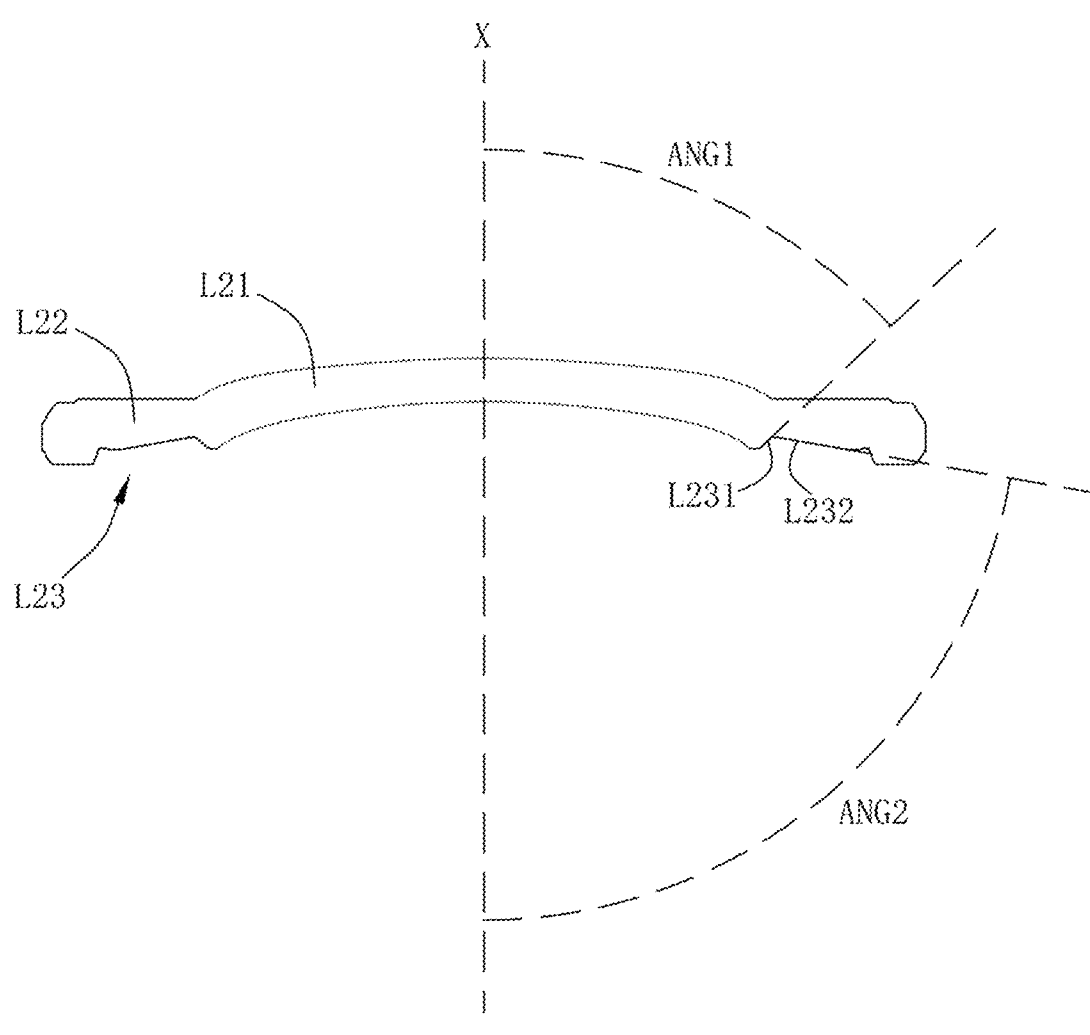
FIG. 34 is a schematic structural diagram of the second lens shown in FIG. 33.
Figure 35:
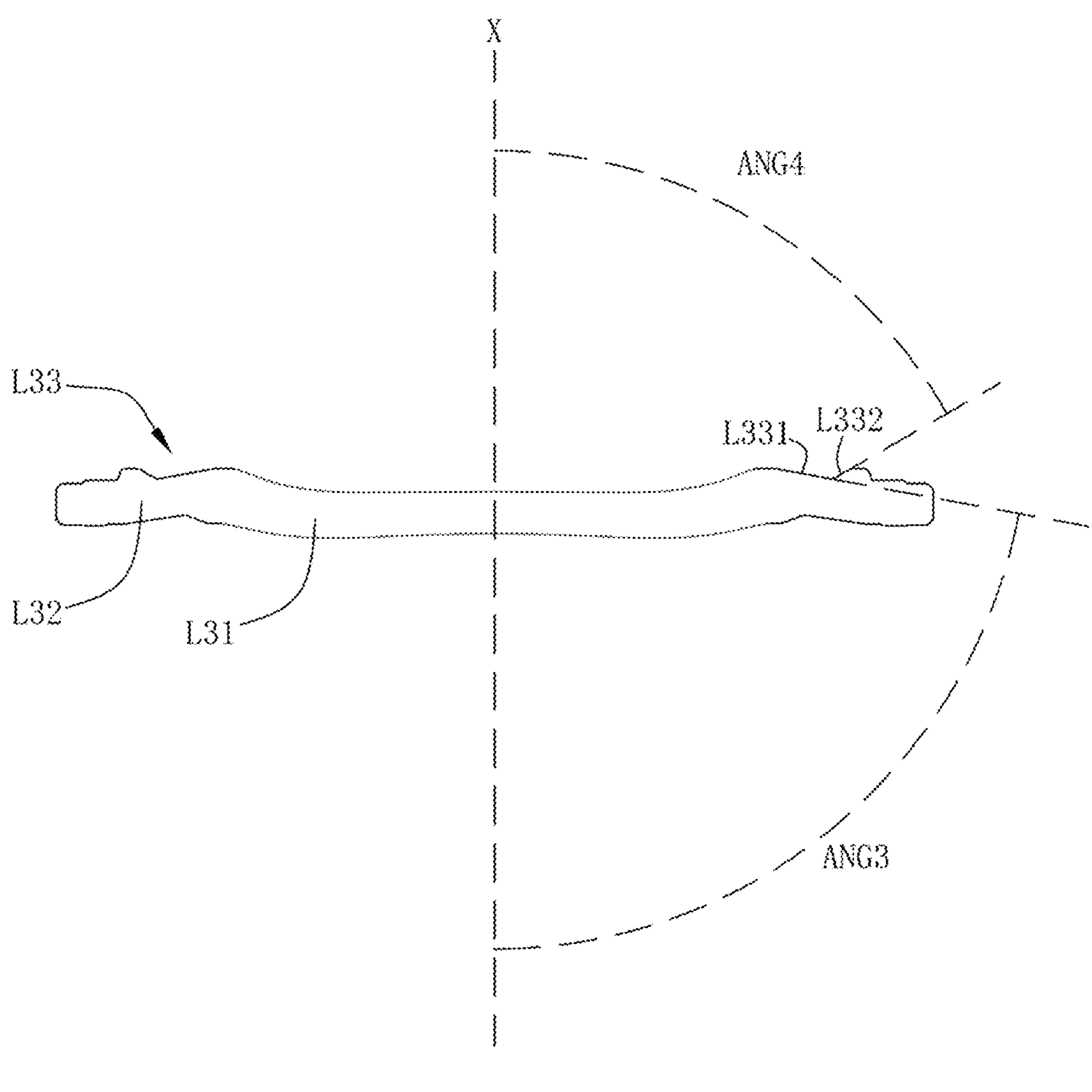
FIG. 35 is a schematic structural diagram of the third lens shown in FIG. 33.

Referring to FIGS. 33-35, the present disclosure also provides a lens assembly 100, each of the first to seventh lenses includes an optical portion for imaging and a structural portion surrounding the optical portion. The second lens L2 includes a second optical portion L21 for imaging and a second structural portion L22 surrounding the second optical portion L21. The third lens L3 includes a third optical portion L31 for imaging and a third structural portion L32 surrounding the third optical portion L31. The second structural portion L22 includes a first surface L23 adjacent to an image side. The third structural portion L32 includes a second surface L33 adjacent to an object side. The first surface L23 includes a first inclination surface L231 adjacent to the second optical portion L21 and a second inclination surface L232 provided on a side of the first inclination surface L231 away from the second optical portion L21. The second surface L23 includes a third inclination surface L331 adjacent to the third optical portion L31 and a fourth inclination surface L332 provided on a side of the third inclination surface L331 away from the third optical portion L31. An angle between the first inclination surface L231 and an optical axis X is ANG1, and an angle between the fourth inclination surface L332 and the optical axis X is ANG4, and a following relational expression is satisfied: $|ANG1-ANG4|\leq 30°$.

An angle between the second inclination surface L232 and the optical axis X is defined as ANG2, an angle between the third inclination surface L331 and the optical axis X is defined as ANG3, and a following relational expression is satisfied: $|ANG2-ANG3|\leq 10°$.

The first inclination surface L231 is inclined from inside to outside in a direction adjacent to the object side, a curvature radius of the image-side surface of the second lens in the paraxial region is defined as R4, a maximum optical radius of the image-side surface of the second lens is defined as SD22, and a following relational expression is satisfied: $3.00\leq R4/SD22*\tan(ANG1)\leq 5.00$. When the image-side surface of the second lens is concave, the first inclination surface is inclined to the object side, so that the height difference and the thickness difference of the optical portion and the structural portion are effectively controlled, and it is beneficial to molding. In addition, the control of the inclination angle is beneficial to reducing stray light.

The third inclination surface L331 is inclined from inside to outside in a direction adjacent to the image side, a curvature radius of the object-side surface of the third lens in the paraxial region is defined as R5, a maximum optical radius of the object-side surface of the third lens is defined as SD31, and a following relational expression is satisfied: $1.50\leq R5/SD31*\cos(ANG3)\leq 4.00$. The third inclination surface is inclined to the image side, so that the height difference and the thickness difference of the optical portion and the structural portion are effectively controlled, and it is beneficial to molding. In addition, the control of the inclination angle is beneficial to reducing stray light.

The first lens L1 is made of glass, the second lens L2 is made of plastic material, the third lens L3 is made of plastic material, the fourth lens L4 is made of plastic material, the fifth lens L5 is made of plastic material, the sixth lens L6 is made of plastic material, and the seventh lens L7 is made of plastic material. The lenses may also be made of other materials.

The first lens has positive refractive power, an object-side surface of the first lens is convex in a paraxial region, and an image-side surface of the first lens is concave in the paraxial region. The second lens has negative refractive power, an object-side surface of the second lens is convex in the paraxial region, and an image-side surface of the second lens is concave in the paraxial region. The third lens has negative refractive power, an object-side surface of the third lens is convex in the paraxial region, and an image-side surface of the third lens is concave in the paraxial region. The fourth lens has positive refractive power, an object-side surface of the fourth lens is convex in the paraxial region, and an image-side surface of the fourth lens is convex or concave in the paraxial region. The fifth lens has negative refractive power, an object-side surface of the fifth lens is concave in the paraxial region, and an image-side surface of the fifth lens is concave in the paraxial region. The sixth lens has positive refractive power, an object-side surface of the sixth lens is convex in the paraxial region, and an image-side surface of the sixth lens is concave in the paraxial region. The seventh lens has negative refractive power, an object-side surface of the seventh lens is convex in the paraxial region, and an image-side surface of the seventh lens is concave in the paraxial region.

The object-side surface and the image-side surface of the first lens L1, the second lens L2, the third lens L3, the fourth lens L4, the fifth lens L5, the sixth lens L6, and the seventh lens L7 are aspheric surfaces.

A maximum optical radius of the object-side surface of the fifth lens is defined as SD51, a sagittal height at the maximum optical radius of the object-side surface of the fifth lens is defined as SAG51, a maximum optical radius of the image-side surface of the seventh lens is defined as SD72, a sagittal height at the maximum optical radius of the image-side surface of the seventh lens is defined as SAG72, a central curvature radius of the object-side surface of the fifth lens in the paraxial region is defined as R9, a central curvature radius of the image-side surface of the seventh lens in the paraxial region is defined as R14, and a following relational expression is satisfied: $-8.00 \leq (SAG51/SD51*R9)/(SAG72/SD72*R14) \leq -3.30$. Within the range of the relational expression, both the object-side surface of the fifth lens and the object-side surface of the seventh lens have surface shapes that are easy to process, which improves the processability. Optionally, a following relational expression is satisfied: $-7.10 \leq (SAG51/SD51*R9)/(SAG72/SD72*R14) \leq -4.05$. The sagittal height refers to the distance from the point on the surface to the center point on the optical axis along the optical axis, which is positive on the right side of the center point and negative on the left side of the center point.

A vertical height from the intersection of the main light of the 1.0 field of view and the object-side surface of the seventh lens to the optical axis is defined as HC71, a maximum optical radius of the object-side surface of the seventh lens is defined as SD71, and a following relational expression is satisfied: $0.80 \leq HC71/SD71 \leq 0.95$. Within the range of the relational expression, it achieves a large enough field of view and improve the relative illuminance of the surrounding field of view.

A vertical height from the intersection of the main light of the 1.0 field of view and the image-side surface of the seventh lens to the optical axis is defined as HC72, a maximum optical radius of the image-side surface of the seventh lens is defined as SD72, and a following relational expression is satisfied: $0.85 \leq HC72/SD72 \leq 0.97$; within the range of the relational expression, it achieves a large enough field of view and improve the relative illuminance of the surrounding field of view.

An on-axis distance between the fifth lens and the sixth lens is defined as d10, an on-axis distance between the sixth lens and the seventh lens is defined as d12, an on-axis thickness of the sixth lens is defined as d11, and a following relational expression is satisfied: $1.10 \leq (d10+d12)/d11 \leq 2.10$. It is beneficial to improve the assembly yield of the latter three lenses by reasonably controlling the center thickness of the sixth lens and the front-rear air gap. Optionally, a following relational expression is satisfied: $1.30 \leq (d10+d12)/d11 \leq 1.91$.

An on-axis distance between the third lens and the fourth lens is defined as d6, a total optical length from the object-side surface of the first lens to an image surface of the camera optical lens along an optic axis is defined as TTL, and a following relational expression is satisfied: $0.007 \leq d6/TTL \leq 0.013$. It is beneficial to achieve ultra-thinness by reasonably controlling a ratio of an on-axis distance between the third lens and the fourth lens to a total optical length from the object-side surface of the first lens to an image surface of the camera optical lens along an optic axis.

A focal length of the sixth lens is defined as f6, and the focal length of the seventh lens is defined as f7, and a following relational expression is satisfied: $-0.85 \leq f6/f7 \leq -0.45$. The refractive powers of the sixth lens and the seventh lens may be adjusted to compress the volume and correct the aberration. Optionally, a following relational expression is satisfied: $-0.76 \leq f6/f7 \leq -0.52$.

A central curvature radius of the object-side surface of the first lens in the paraxial region is defined as R1, a central curvature radius of the image-side surface of the first lens in the paraxial region is defined as R2, a focal length of the camera optical lens is defined as f, and a following relational expression is satisfied: $1.00 \leq (R1+R2)/f \leq 2.10$. Within the range of the relational expression, it is beneficial to shorten the total length of the system. Optionally, a following relational expression is satisfied: $1.15 \leq (R1+R2)/f \leq 1.85$.

A distance along the optical axis from the aperture to the center of the object-side surface of the first lens is defined as TEP, a sagittal height at the of the object-side surface of the first lens is defined as SAG11, a focal length of the first lens is defined as f1, and a following relational expression is satisfied: $0.06 \leq |TEP/SAG11|*(f/f1) \leq 0.09$. Within the range of the relational expression, the aperture is protruding, and the outer space of the aperture is larger, which is beneficial to the structural design of the variable aperture.

An on-axis distance between the first lens and the second lens is defined as d2, an on-axis distance between the fourth lens and the fifth lens is defined as d8, and a following relational expression is satisfied: $1.95 \leq d8/d234.05$, the air gap between the lenses may be reasonably controlled, so that the system has high imaging quality and good processability. Optionally, a following relational expression is satisfied: $2.44 \leq d8/d2 \leq 3.40$.

A focal length of the first lens is defined as f1, a focal length of the second lens is defined as f2, a focal length of the third lens is defined as f3, and a following relational expression is satisfied: $-0.88 \leq f1/(f2-f3) \leq -0.05$. Within the range of the relational expression, it is beneficial to the correction of chromatic aberration, and achieve the balance of various aberrations. Optionally, a following relational expression is satisfied: $-0.75 \leq f1/(f2-f3) \leq -0.06$.

A focal length of the camera optical lens is defined as f, a combined focal length of the first lens and the second lens is defined as f12, a following relational expression is satisfied: $1.10 \leq f12/f \leq 1.60$. Through reasonable configuration of focal lengths of the first lens L1 and the second lens L2, chromatic aberration is eliminated, spherical aberration is reduced, the astigmatism is corrected, and the resolving power is improved. Optionally, a following relational expression is satisfied: $1.28 \leq f12/f \leq 1.36$.

A focal length of the fourth lens is defined as f4, a focal length of the fifth lens is defined as f5, a central curvature radius of the object-side surface of the fourth lens in the paraxial region is defined as R7, a central curvature radius of the object-side surface of the fifth lens in the paraxial region is defined as R9, and a following relational expression is satisfied: 2.20≤f4/R7+f5/R9≤3.80. It is beneficial to achieve wide angle and improve a processing yield of the fourth lens and the fifth lens by reasonably controlling the ratio of the curvature radius to the focal length of the object side of the fourth lens and the fifth lens, which is beneficial to achieve wide angle and improve a processing yield of the fourth lens and the fifth lens. Optionally, a following relational expression is satisfied: 2.70≤f4/R7+f5/R9≤3.20.

A focal length of the fifth lens is defined as f5, a focal length of the sixth lens is defined as f6, a focal length of the camera optical lens is defined as f, and a following relational expression is satisfied: 1.65≤|f/f5|+|f/f6|≤2.69, it is beneficial to achieve the imaging effect with high definition by reasonably configuring the refractive power of each lens. Optionally, a following relational expression is satisfied: 1.96≤|f/f5|+|f/f6|≤2.28.

The first lens is made by glass, and the glass is matched with the resin lens to reduce chromatic aberration and improve performance of the optical camera lens.

Compared with the related art, the camera optical lens provided by the present disclosure is configured by −8.00≤(SAG51/SD51*R9)/(SAG72/SD72*R14)≤−3.30;

$$0.80 \le HC71/SD71 \le 0.95;$$

$$0.85 \le HC72/SD72 \le 0.97;$$

$$1.10 \le (d10+d12)/d11 \le 2.10;$$

$$0.007 \le d6/TTL \le 0.013;$$

$$-0.85 \le f6/f7 \le -0.45;$$

and 1.00≤(R1+R2)/f≤2.10, the technical effects of good processability, high relative illuminance, wide angle, high assembly yield and ultra-thinness can be achieved.

Compared with the related art, the camera optical lens provided by the present disclosure is configured by −8.00≤(SAG51/SD51*R9)/(SAG72/SD72*R14)≤−3.30;

$$0.80 \le HC71/SD71 \le 0.95;$$

$$0.85 \le HC72/SD72 \le 0.97;$$

$$1.10 \le (d10+d12)/d11 \le 2.10;$$

$$-0.88 \le f1/(f2-f3) \le -0.05;$$

1.10≤f12/f≤1.60; and 2.20≤f4/R7+f5/R9≤3.80, it can achieve the technical effects of good processability, high relative illumination, wide angle, small chromatic aberration, small spherical aberration, small astigmatism, high resolving power and high processing yield.

The camera optical lens of the present disclosure will be described below with examples. The reference signs recited in each example are shown below. The units of focal length, on-axis distance, central curvature radius and on-axis thickness are mm.

TTL: a total optical length (an on-axis distance from the object-side surface of the first lens L1 to the image surface Si), in mm.

F-number FNO: refers to a ratio of the effective focal length of the camera optical lens to the entrance pupil diameter of the camera optical lens.

The technical solutions of the present disclosure will be described in detail in eight embodiments, the technical effect of the disclosure cannot be achieved when the range of the above relational expression is exceeded.

Embodiment 1

Table 1 and Table 2 show design data of the camera optical lens 10 according to Embodiment 1 of the present disclosure.

TABLE 1

| | R | d | | nd | | vd | |
|---|---|---|---|---|---|---|---|
| S1 | ∞ | d0= | −0.113 | | | | |
| R1 | 3.415 | d1= | 1.405 | nd1 | 1.4959 | v1 | 81.65 |
| R2 | 9.648 | d2= | 0.339 | | | | |
| R3 | 9.027 | d3= | 0.336 | nd2 | 1.6700 | v2 | 19.39 |
| R4 | 7.362 | d4= | 0.550 | | | | |
| R5 | 31.316 | d5= | 0.353 | nd3 | 1.6700 | v3 | 19.39 |
| R6 | 14.641 | d6= | 0.091 | | | | |
| R7 | 17.371 | d7= | 0.819 | nd4 | 1.5444 | v4 | 55.82 |
| R8 | −108.741 | d8= | 0.839 | | | | |
| R9 | −8.185 | d9= | 0.609 | nd5 | 1.5661 | v5 | 37.71 |
| R10 | 31.147 | d10= | 0.018 | | | | |
| R11 | 2.454 | d11= | 0.847 | nd6 | 1.5346 | v6 | 55.69 |
| R12 | 7.802 | d12= | 1.097 | | | | |
| R13 | 4.896 | d13= | 0.695 | nd7 | 1.5346 | v7 | 55.69 |
| R14 | 2.354 | d14= | 1.128 | | | | |
| R15 | ∞ | d15= | 0.310 | ndg | 1.5168 | vg | 64.17 |
| R16 | ∞ | d16= | 0.672 | | | | |

The meaning of each reference sign is as follows.

S1: aperture;

R: curvature radius at the center of the optical surface;

R1: central curvature radius of the object-side surface of the first lens L1 in the paraxial region;

R2: central curvature radius of the image-side surface of the first lens L1 in the paraxial region;

R3: central curvature radius of the object-side surface of the second lens L2 in the paraxial region;

R4: central curvature radius of the image-side surface of the second lens L2 in the paraxial region;

R5: central curvature radius of the object-side surface of the third lens L3 in the paraxial region;

R6: central curvature radius of the image-side surface of the third lens L3 in the paraxial region;

R7: central curvature radius of the object-side surface of the fourth lens L4 in the paraxial region;

R8: central curvature radius of the image-side surface of the fourth lens L4 in the paraxial region;

R9: central curvature radius of the object-side surface of the fifth lens L5 in the paraxial region;

R10: central curvature radius of the image-side surface of the fifth lens L5 in the paraxial region;

R11: central curvature radius of the object-side surface of the sixth lens L6 in the paraxial region;

R12: central curvature radius of the image-side surface of the sixth lens L6 in the paraxial region;

R13: central curvature radius of the object-side surface of the seventh lens L7 in the paraxial region;

R14: central curvature radius of the image-side surface of the seventh lens L7 in the paraxial region;

R15: central curvature radius of the object-side surface of the grating filter GF;

R16: central curvature radius of the image-side surface of the grating filter GF;

d: on-axis thickness of lenses, on-axis distance between lenses;

do: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;

d11: on-axis thickness of the sixth lens L6;

d12: on-axis distance from the image-side surface of the sixth lens L6 to the object-side surface of the seventh lens L7;

d13: on-axis thickness of the seventh lens L7;

d14: on-axis distance from the image-side surface of the seventh lens L7 to the object-side surface of the grating filter GF;

d15: on-axis thickness of the grating filter GF;

d16: on-axis distance from the image-side surface of the grating filter GF to the image surface S1;

nd: refractive index of d line (the d line is green light with a wavelength of 550 nm);

nd1: refractive index of d line of the first lens L1;

nd2: refractive index of d line of the second lens L2;

nd3: refractive index of d line of the third lens L3;

nd4: refractive index of d line of the fourth lens L4;

nd5: refractive index of d line of the fifth lens L5;

nd6: refractive index of d line of the sixth lens L6;

nd7: refractive index of d line of the seventh lens L7;

ndg: refractive index of d line of the grating filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

v7: abbe number of the seventh lens L7; and vg: abbe number of the grating filter GF.

Table 2 shows aspheric surface data of each lens in the camera optical lens 10 according to Embodiment 1 of the present disclosure.

TABLE 2

| | Conic Coefficient | Aspheric Coefficient | | | | |
|---|---|---|---|---|---|---|
| | k | A4 | A6 | A8 | A10 | A12 |
| R1 | 1.6661E−03 | 2.9448E−03 | −6.7107E−03 | 7.2031E−03 | −4.4399E−03 | 1.6547E−03 |
| R2 | −3.8723E−01 | −7.5598E−04 | −6.1868E−03 | 6.3383E−03 | −3.9220E−03 | 1.5283E−03 |
| R3 | −3.3470E−01 | −5.4136E−03 | −4.1865E−03 | 5.1857E−03 | −2.9977E−03 | 1.1334E−03 |
| R4 | 2.1890E−01 | −1.2547E−03 | −8.6291E−03 | 1.2935E−02 | −1.0516E−02 | 5.4694E−03 |
| R5 | 4.0598E+00 | −5.3940E−03 | 3.9616E−06 | −2.9569E−03 | 2.2434E−03 | −9.6394E−04 |
| R6 | −1.3465E+00 | −1.4923E−03 | 5.0306E−05 | −9.2893E−03 | 9.7435E−03 | −5.2524E−03 |
| R7 | 2.5380E+00 | 2.6011E−03 | −1.1267E−02 | 4.7118E−03 | −6.0644E−04 | −3.3853E−04 |
| R8 | 9.9929E+02 | −1.2036E−03 | −2.9147E−03 | −5.3425E−04 | 8.5348E−04 | −3.5472E−04 |
| R9 | −1.2296E+00 | 2.6209E−02 | −1.1349E−02 | 6.4518E−04 | 2.3318E−03 | −1.5321E−03 |
| R10 | −1.1311E+00 | −3.3073E−02 | −4.9610E−04 | 6.5172E−03 | −3.6588E−03 | 1.1243E−03 |
| R11 | −6.3361E+00 | 4.8879E−03 | −5.3507E−03 | 1.7039E−03 | −5.2519E−04 | 1.1500E−04 |
| R12 | −4.5729E−01 | 3.1954E−02 | −1.3715E−02 | 2.8996E−03 | −4.3372E−04 | 4.6373E−05 |
| R13 | −9.8032E−01 | −5.9039E−02 | 1.0295E−02 | −1.2381E−03 | 8.8635E−05 | −3.5566E−07 |
| R14 | −9.9908E−01 | −6.9075E−02 | 1.6451E−02 | −3.4017E−03 | 5.5547E−04 | −6.9006E−05 |

| | Conic Coefficient | Aspheric Coefficient | | | | |
|---|---|---|---|---|---|---|
| | k | A14 | A16 | A18 | A20 | A22 |
| R1 | 1.6661E−03 | −3.7992E−04 | 5.2450E−05 | −3.9930E−06 | 1.2874E−07 | 0.0000E+00 |
| R2 | −3.8723E−01 | −3.7467E−04 | 5.5844E−05 | −4.6141E−06 | 1.6189E−07 | 0.0000E+00 |
| R3 | −3.3470E−01 | −2.6614E−04 | 3.6364E−05 | −2.5284E−06 | 6.3534E−08 | 0.0000E+00 |
| R4 | 2.1890E−01 | −1.7917E−03 | 3.5838E−04 | −4.0105E−05 | 1.9346E−06 | 0.0000E+00 |
| R5 | 4.0598E+00 | 2.3414E−04 | −2.7932E−05 | 6.8988E−07 | 1.0496E−07 | 0.0000E+00 |
| R6 | −1.3465E+00 | 1.6657E−03 | −3.1140E−04 | 3.1724E−05 | −1.3540E−06 | 0.0000E+00 |
| R7 | 2.5380E+00 | 1.9408E−04 | −4.3536E−05 | 4.6718E−06 | −1.9550E−07 | 0.0000E+00 |
| R8 | 9.9929E+02 | 7.8796E−05 | −9.8278E−06 | 6.2574E−07 | −1.5040E−08 | 0.0000E+00 |
| R9 | −1.2296E+00 | 4.5932E−04 | −5.8155E−05 | −5.6954E−06 | 3.6198E−06 | −6.7957E−07 |
| R10 | −1.1311E+00 | −2.2043E−04 | 2.8258E−05 | −2.2849E−06 | 9.9743E−08 | −3.2829E−10 |
| R11 | −6.3361E+00 | −1.6379E−05 | 1.4757E−06 | −7.9845E−08 | 2.1953E−09 | −5.5233E−12 |
| R12 | −4.5729E−01 | −3.1841E−06 | 7.1361E−08 | 1.1284E−08 | −1.4823E−09 | 9.2105E−11 |
| R13 | −9.8032E−01 | −6.5153E−07 | 7.4722E−08 | −4.6700E−09 | 1.8905E−10 | −5.1264E−12 |
| R14 | −9.9908E−01 | 6.3898E−06 | −4.3583E−07 | 2.1748E−08 | −7.8814E−10 | 2.0460E−11 |

TABLE 2-continued

| | Conic Coefficient | Aspheric Coefficient | | | | |
|---|---|---|---|---|---|---|
| | k | A24 | A26 | A28 | A30 | / |
| R1 | 1.6661E−03 | 0.0000E+00 | 0.0000E+00 | 0.0000E+00 | 0.0000E+00 | / |
| R2 | −3.8723E−01 | 0.0000E+00 | 0.0000E+00 | 0.0000E+00 | 0.0000E+00 | / |
| R3 | −3.3470E−01 | 0.0000E+00 | 0.0000E+00 | 0.0000E+00 | 0.0000E+00 | / |
| R4 | 2.1890E−01 | 0.0000E+00 | 0.0000E+00 | 0.0000E+00 | 0.0000E+00 | / |
| R5 | 4.0598E+00 | 0.0000E+00 | 0.0000E+00 | 0.0000E+00 | 0.0000E+00 | / |
| R6 | −1.3465E+00 | 0.0000E+00 | 0.0000E+00 | 0.0000E+00 | 0.0000E+00 | / |
| R7 | 2.5380E+00 | 0.0000E+00 | 0.0000E+00 | 0.0000E+00 | 0.0000E+00 | / |
| R8 | 9.9929E+02 | 0.0000E+00 | 0.0000E+00 | 0.0000E+00 | 0.0000E+00 | / |
| R9 | −1.2296E+00 | 7.1390E−08 | −4.4638E−09 | 1.5564E−10 | −2.3377E−12 | / |
| R10 | −1.1311E+00 | −2.1154E−10 | 1.1263E−11 | −2.5144E−13 | 2.1032E−15 | / |
| R11 | −6.3361E+00 | −1.0887E−12 | 4.7415E−15 | 8.0028E−16 | −1.3245E−17 | / |
| R12 | −4.5729E−01 | −3.4813E−12 | 8.1510E−14 | −1.0932E−15 | 6.4501E−18 | / |
| R13 | −9.8032E−01 | 9.1385E−14 | −9.9960E−16 | 5.6897E−18 | −1.0269E−20 | / |
| R14 | −9.9908E−01 | −3.7028E−13 | 4.4347E−15 | −3.1589E−17 | 1.0135E−19 | / |

For convenience, the aspheric surface of each lens surface uses the aspheric surface shown in the following formula (1). However, the present disclosure is not limited to the aspheric polynomial form shown in formula (1).

$$z=(cr^2)/\{1+[1-(k+1)(c^2r^2)]^{1/2}\}+A4r^4+A6r^6+A8r^8+A10r^{10}+A12r^{12}+A14r^{14}+A16r^{16}+A18r^{18}+A20r^{20}+A22r^{22}+A24r^{24}+A26r^{26}+A28r^{28}+A30r^{30} \quad (1)$$

k is a conic coefficient, A4, A6, A8, A10, A12, A14, A16, A18, A20, A22, A24, A26, A28 and A30 are aspheric coefficients, c is a curvature at a center of an optical surface, r is a vertical distance between a point on an aspheric curve and an optical axis, and z is an aspheric depth (a vertical distance between a point on the aspheric surface and the optical axis, where r is a distance from the point on the aspheric surface to the optical axis, and a vertical distance between the point on the aspheric surface and a tangent plane tangent to a vertex on the aspheric optical axis).

Figure 1:
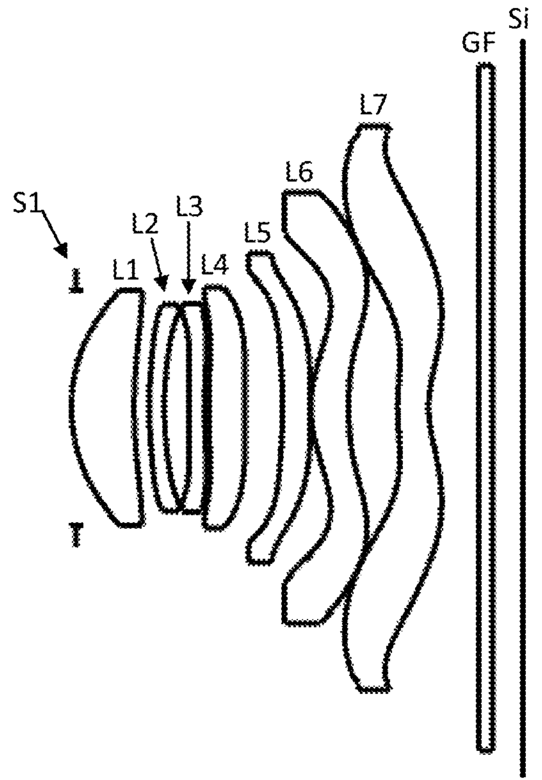
FIG. 1 is a structural schematic diagram of a camera optical lens according to Embodiment 1 of the present disclosure.
Figure 2:
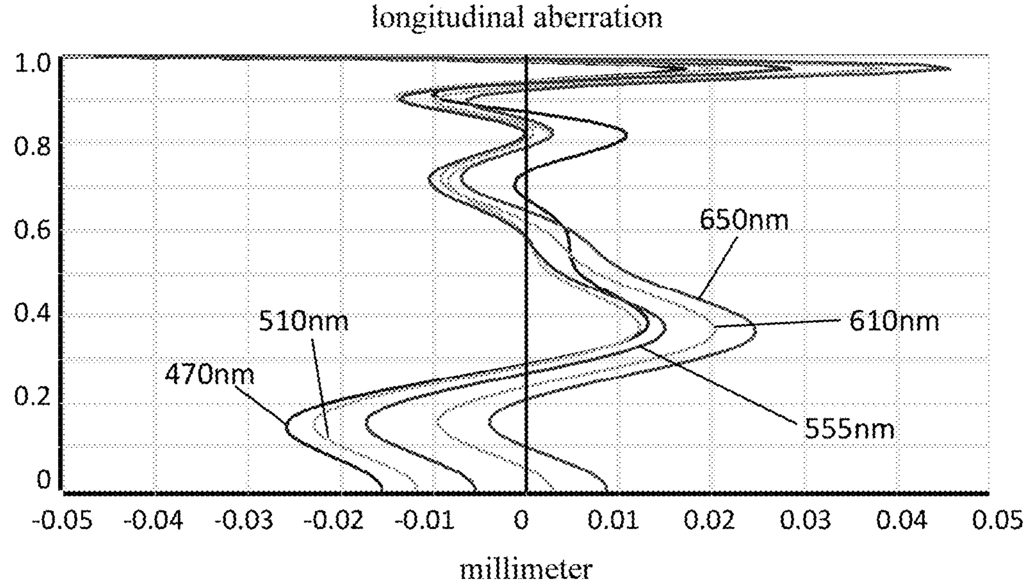
FIG. 2 is a schematic diagram of longitudinal aberration of the camera optical lens shown in FIG. 1.
Figure 3:
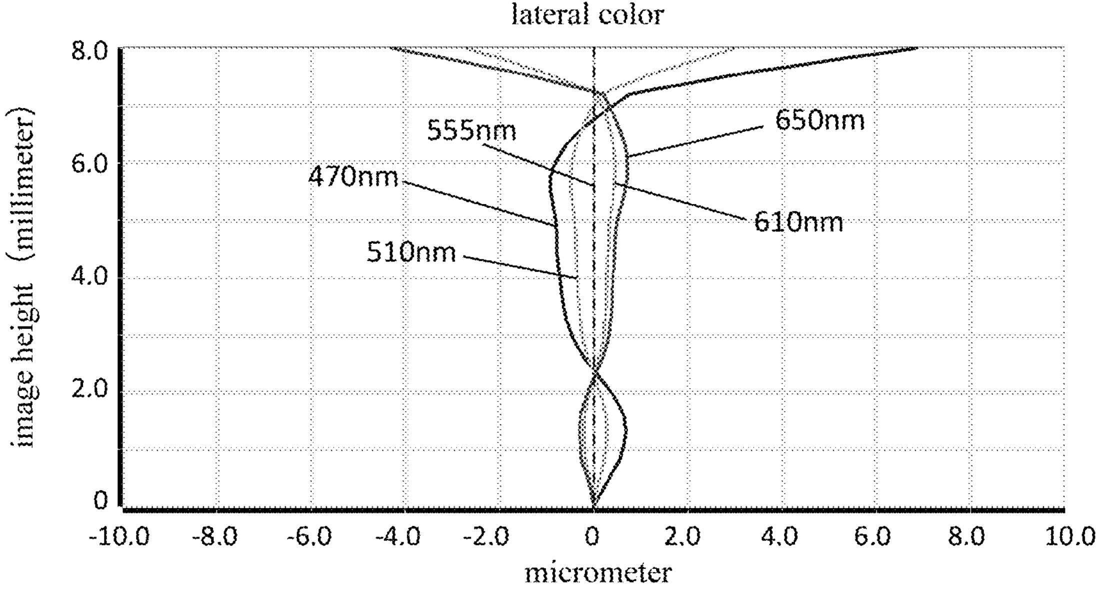
FIG. 3 is a schematic diagram of lateral color of the camera optical lens shown in FIG. 1.
Figure 4:
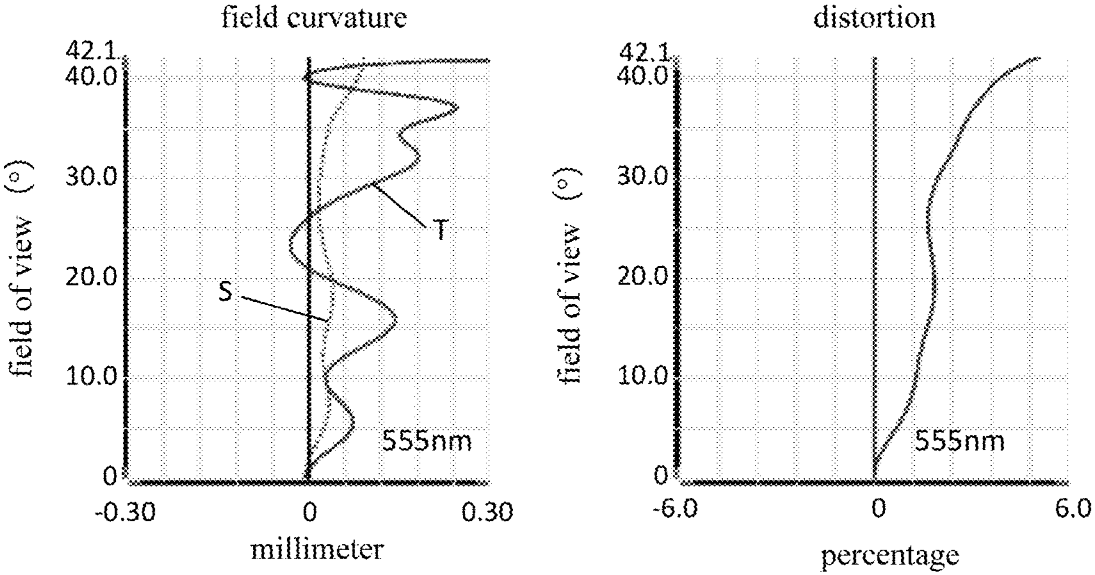
FIG. 4 is a schematic diagram of field curvature and distortion of the camera optical lens shown in FIG. 1.

FIG. 2 and FIG. 3 respectively show longitudinal aberration and lateral color of light with wavelengths of 650 nm, 610 nm, 555 nm, 510 nm, and 470 nm after passing through the camera optical lens 10 according to Embodiment 1. FIG. 4 shows field curvature and distortion of light with a wavelength of 555 nm after passing through the camera optical lens 10 according to Embodiment 1. The field curvature S in FIG. 4 is the field curvature in a sagittal direction, and T is the field curvature in a meridional direction.

In this embodiment, the entrance pupil diameter ENPD of the camera optical lens 10 is 5.103 mm, the full field of view (1.0 field of view) image height IH is 8.000 mm, the MIC field of view image height IH is 8.250 mm, the field of view FOV of the full field of view (1.0 field of view) in a diagonal direction is 84.25°, the field of view FOV of the MIC field of view in a diagonal direction is 85.17°, the camera optical lens 10 meets the design requirements of high relative illumination, wide angle, good processability, the on-axis and off-axis color aberrations are fully corrected. The camera optical lens 10 has excellent optical characteristics.

It may be understood that the 1.0 field of view image height refers to half of the diagonal length of an effective pixel area of the sensor; the MIC field of view image height refers to a height of field of view that is expanded from the 1.0 field of view image height and is used to prevent assembly deviation; the FOV in the diagonal direction of the 1.0 field of view refers to the field of view corresponding to the effective pixel area of the sensor; and the FOV in the diagonal direction of the MIC field of view refers to a field of view corresponding to the MIC field of view image height.

Embodiment 2

The meaning of the reference signs of Embodiment 2 is the same as that of Embodiment 1.

Figure 5:
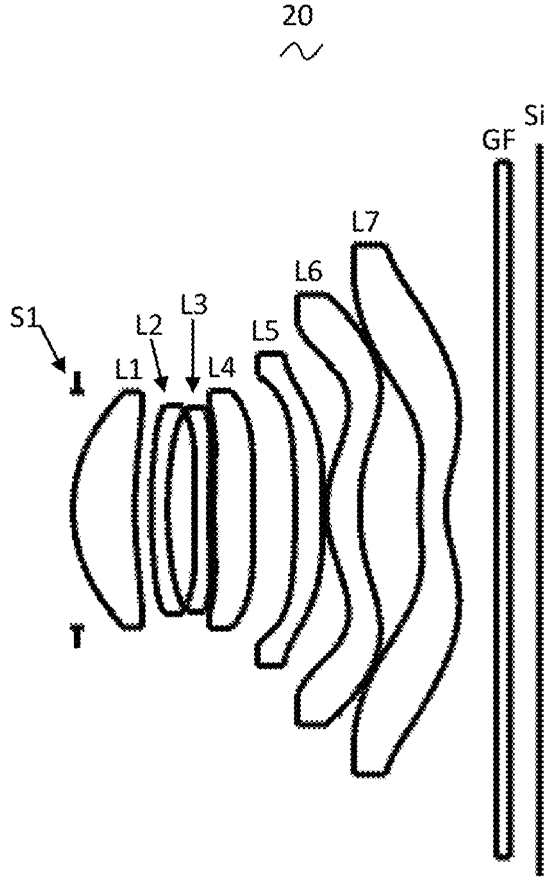
FIG. 5 is a structural schematic diagram of a camera optical lens according to Embodiment 2 of the present disclosure.

FIG. 5 shows a camera optical lens 20 according to Embodiment 2 of the present disclosure.

Table 3 and Table 4 show design data of the camera optical lens 20 according to Embodiment 2 of the present disclosure.

TABLE 3

| | R | d | | nd | | vd | |
|---|---|---|---|---|---|---|---|
| S1 | ∞ | d0= | −0.094 | | | | |
| R1 | 3.418 | d1= | 1.337 | nd1 | 1.4959 | v1 | 81.65 |
| R2 | 10.108 | d2= | 0.348 | | | | |
| R3 | 10.009 | d3= | 0.356 | nd2 | 1.6700 | v2 | 19.39 |
| R4 | 7.854 | d4= | 0.573 | | | | |
| R5 | 33.054 | d5= | 0.323 | nd3 | 1.6700 | v3 | 19.39 |
| R6 | 15.446 | d6= | 0.102 | | | | |
| R7 | 18.143 | d7= | 0.862 | nd4 | 1.5444 | v4 | 55.82 |
| R8 | −79.755 | d8= | 0.906 | | | | |
| R9 | −9.176 | d9= | 0.577 | nd5 | 1.5661 | v5 | 37.71 |
| R10 | 26.595 | d10= | 0.084 | | | | |
| R11 | 2.377 | d11= | 0.726 | nd6 | 1.5346 | v6 | 55.69 |
| R12 | 6.840 | d12= | 1.292 | | | | |
| R13 | 5.253 | d13= | 0.565 | nd7 | 1.5346 | v7 | 55.69 |
| R14 | 2.361 | d14= | 1.086 | | | | |
| R15 | ∞ | d15= | 0.310 | ndg | 1.5168 | vg | 64.17 |
| R16 | ∞ | d16= | 0.613 | | | | |

Table 4 shows aspheric surface data of each lens in the camera optical lens 20 according to Embodiment 2 of the present disclosure.

TABLE 4

| | Conic Coefficient | Aspheric Coefficient | | | | |
|---|---|---|---|---|---|---|
| | k | A4 | A6 | A8 | A10 | A12 |
| R1 | −2.5189E−03 | 3.0441E−03 | −6.7299E−03 | 7.1984E−03 | −4.4396E−03 | 1.6547E−03 |
| R2 | −3.6017E−01 | −8.0092E−04 | −6.1865E−03 | 6.3392E−03 | −3.9214E−03 | 1.5283E−03 |
| R3 | −6.9085E−01 | −5.4894E−03 | −4.1771E−03 | 5.1930E−03 | −2.9982E−03 | 1.1336E−03 |
| R4 | 2.4366E−01 | −1.2591E−03 | −8.6736E−03 | 1.2941E−02 | −1.0518E−02 | 5.4696E−03 |
| R5 | 3.2673E+01 | −5.2884E−03 | −5.0198E−05 | −2.9539E−03 | 2.2438E−03 | −9.6409E−04 |
| R6 | 6.5516E−01 | −1.8054E−03 | 5.3518E−05 | −9.2955E−03 | 9.7421E−03 | −5.2524E−03 |
| R7 | −2.1569E+00 | 2.7037E−03 | −1.1309E−02 | 4.7032E−03 | −6.0631E−04 | −3.3876E−04 |
| R8 | −9.5123E+02 | −8.5231E−04 | −2.9162E−03 | −5.3899E−04 | 8.5130E−04 | −3.5485E−04 |
| R9 | 1.5722E+00 | 2.5493E−02 | −1.1299E−02 | 6.5556E−04 | 2.3315E−03 | −1.5322E−03 |
| R10 | 4.3027E+00 | −3.2963E−02 | −4.8294E−04 | 6.5174E−03 | −3.6587E−03 | 1.1243E−03 |
| R11 | −5.8077E+00 | 5.2230E−03 | −5.3369E−03 | 1.7033E−03 | −5.2521E−04 | 1.1500E−04 |
| R12 | −1.4406E+00 | 3.1733E−02 | −1.3713E−02 | 2.8997E−03 | −4.3372E−04 | 4.6373E−05 |
| R13 | −1.0009E+00 | −5.9099E−02 | 1.0294E−02 | −1.2381E−03 | 8.8635E−05 | −3.5569E−07 |
| R14 | −9.9048E−01 | −6.9317E−02 | 1.6450E−02 | −3.4017E−03 | 5.5547E−04 | −6.9006E−05 |

| | Conic Coefficient | Aspheric Coefficient | | | | |
|---|---|---|---|---|---|---|
| | k | A14 | A16 | A18 | A20 | A22 |
| R1 | −2.5189E−03 | −3.7992E−04 | 5.2451E−05 | −3.9933E−06 | 1.2865E−07 | 0.0000E+00 |
| R2 | −3.6017E−01 | −3.7466E−04 | 5.5842E−05 | −4.6143E−06 | 1.6173E−07 | 0.0000E+00 |
| R3 | −6.9085E−01 | −2.6611E−04 | 3.6356E−05 | −2.5301E−06 | 6.3371E−08 | 0.0000E+00 |
| R4 | 2.4366E−01 | −1.7915E−03 | 3.5840E−04 | −4.0107E−05 | 1.9331E−06 | 0.0000E+00 |
| R5 | 3.2673E+01 | 2.3414E−04 | −2.7935E−05 | 6.9201E−07 | 1.0494E−07 | 0.0000E+00 |
| R6 | 6.5516E−01 | 1.6657E−03 | −3.1139E−04 | 3.1726E−05 | −1.3543E−06 | 0.0000E+00 |
| R7 | −2.1569E+00 | 1.9409E−04 | −4.3537E−05 | 4.6713E−06 | −1.9516E−07 | 0.0000E+00 |
| R8 | −9.5123E+02 | 7.8803E−05 | −9.8245E−06 | 6.2678E−07 | −1.5132E−08 | 0.0000E+00 |
| R9 | 1.5722E+00 | 4.5932E−04 | −5.8156E−05 | −5.6955E−06 | 3.6198E−06 | −6.7957E−07 |
| R10 | 4.3027E+00 | −2.2043E−04 | 2.8258E−05 | −2.2849E−06 | 9.9742E−08 | −3.2826E−10 |
| R11 | −5.8077E+00 | −1.6380E−05 | 1.4757E−06 | −7.9845E−08 | 2.1953E−09 | −5.5245E−12 |
| R12 | −1.4406E+00 | −3.1841E−06 | 7.1361E−08 | 1.1284E−08 | −1.4823E−09 | 9.2105E−11 |
| R13 | −1.0009E+00 | −6.5153E−07 | 7.4722E−08 | −4.6700E−09 | 1.8905E−10 | −5.1264E−12 |
| R14 | −9.9048E−01 | 6.3898E−06 | −4.3583E−07 | 2.1748E−08 | −7.8814E−10 | 2.0460E−11 |

| | Conic Coefficient | Aspheric Coefficient | | | | |
|---|---|---|---|---|---|---|
| | k | A24 | A26 | A28 | A30 | / |
| R1 | −2.5189E−03 | 0.0000E+00 | 0.0000E+00 | 0.0000E+00 | 0.0000E+00 | / |
| R2 | −3.6017E−01 | 0.0000E+00 | 0.0000E+00 | 0.0000E+00 | 0.0000E+00 | / |
| R3 | −6.9085E−01 | 0.0000E+00 | 0.0000E+00 | 0.0000E+00 | 0.0000E+00 | / |
| R4 | 2.4366E−01 | 0.0000E+00 | 0.0000E+00 | 0.0000E+00 | 0.0000E+00 | / |
| R5 | 3.2673E+01 | 0.0000E+00 | 0.0000E+00 | 0.0000E+00 | 0.0000E+00 | / |
| R6 | 6.5516E−01 | 0.0000E+00 | 0.0000E+00 | 0.0000E+00 | 0.0000E+00 | / |
| R7 | −2.1569E+00 | 0.0000E+00 | 0.0000E+00 | 0.0000E+00 | 0.0000E+00 | / |
| R8 | −9.5123E+02 | 0.0000E+00 | 0.0000E+00 | 0.0000E+00 | 0.0000E+00 | / |
| R9 | 1.5722E+00 | 7.1390E−08 | −4.4638E−09 | 1.5564E−10 | −2.3375E−12 | / |
| R10 | 4.3027E+00 | −2.1154E−10 | 1.1263E−11 | −2.5145E−13 | 2.1043E−15 | / |
| R11 | −5.8077E+00 | −1.0887E−12 | 4.7391E−15 | 7.9997E−16 | −1.3226E−17 | / |
| R12 | −1.4406E+00 | −3.4813E−12 | 8.1510E−14 | −1.0932E−15 | 6.4504E−18 | / |
| R13 | −1.0009E+00 | 9.1385E−14 | −9.9960E−16 | 5.6897E−18 | −1.0268E−20 | / |
| R14 | −9.9048E−01 | −3.7028E−13 | 4.4347E−15 | −3.1589E−17 | 1.0135E−19 | / |

Figure 6:
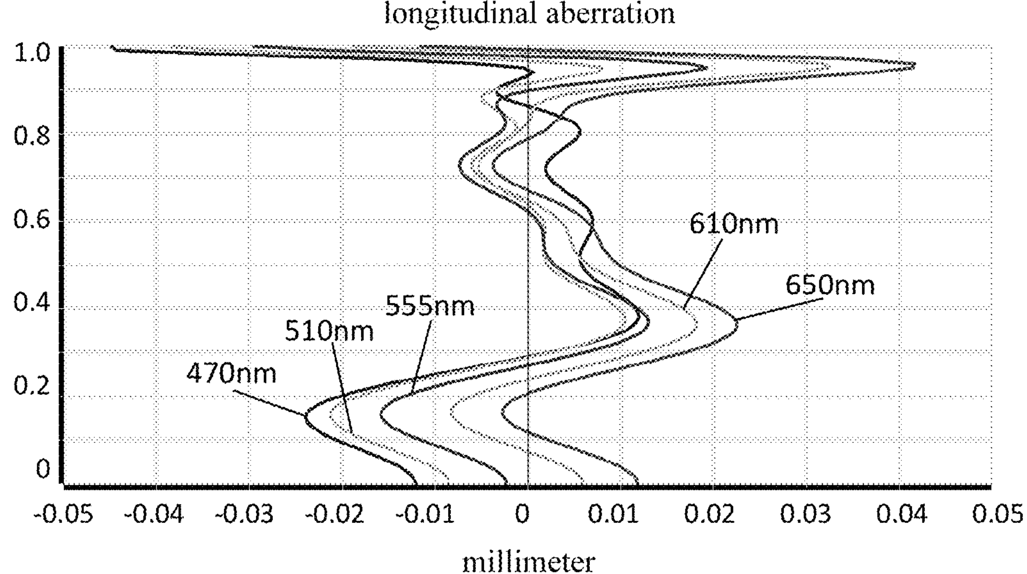
FIG. 6 is a schematic diagram of longitudinal aberration of the camera optical lens shown in FIG. 5.
Figure 7:
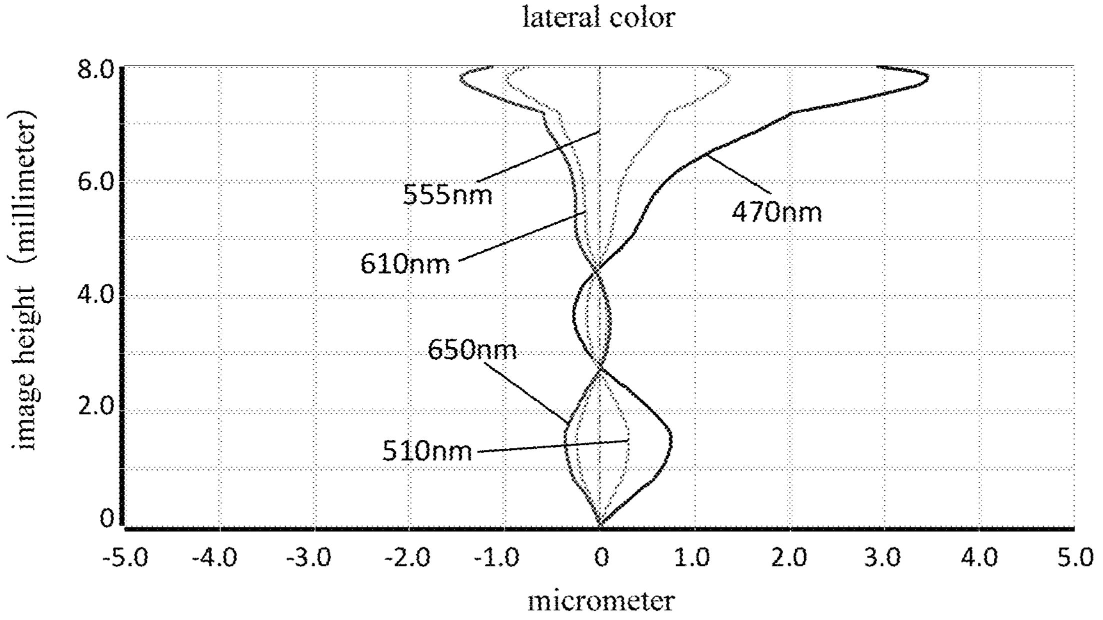
FIG. 7 is a schematic diagram of lateral color of the camera optical lens shown in FIG. 5.
Figure 8:
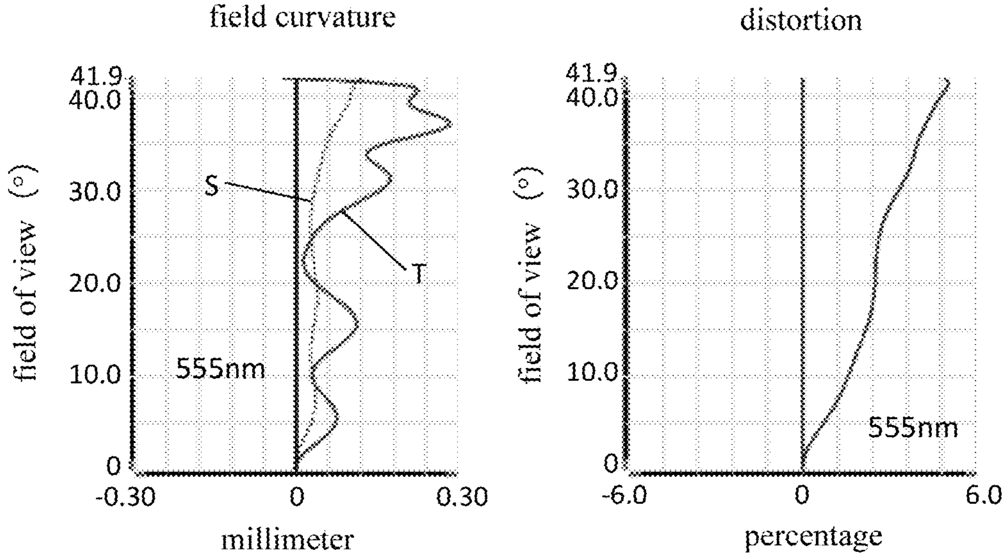
FIG. 8 is a schematic diagram of field curvature and distortion of the camera optical lens shown in FIG. 5.

FIG. 6 and FIG. 7 respectively show longitudinal aberration and lateral color of light with wavelengths of 650 nm, 610 nm, 555 nm, 510 nm, and 470 nm after passing through the camera optical lens 20 according to Embodiment 2. FIG. 8 shows field curvature and distortion of light with a wavelength of 555 nm after passing through the camera optical lens 20 according to Embodiment 2. The field curvature S in FIG. 8 is the field curvature in the sagittal direction, and T is the field curvature in the meridian direction.

In this embodiment, the entrance pupil diameter ENPD of the camera optical lens 20 is 5.140 mm, the full field of view (1.0 field of view) image height IH is 8.000 mm, the MIC field of view image height IH is 8.250 mm, the field of view FOV of the full field of view (1.0 field of view) in a diagonal direction is 83.85°, the field of view FOV of the MIC field of view in a diagonal direction is 85.22°, the camera optical lens 20 meets the design requirements of high relative illumination, wide angle, good processability, the on-axis and off-axis color aberrations are fully corrected. The camera optical lens 20 has excellent optical characteristics.

Embodiment 3

The meaning of the reference signs of Embodiment 3 is the same as that of Embodiment 1.

Figure 9:
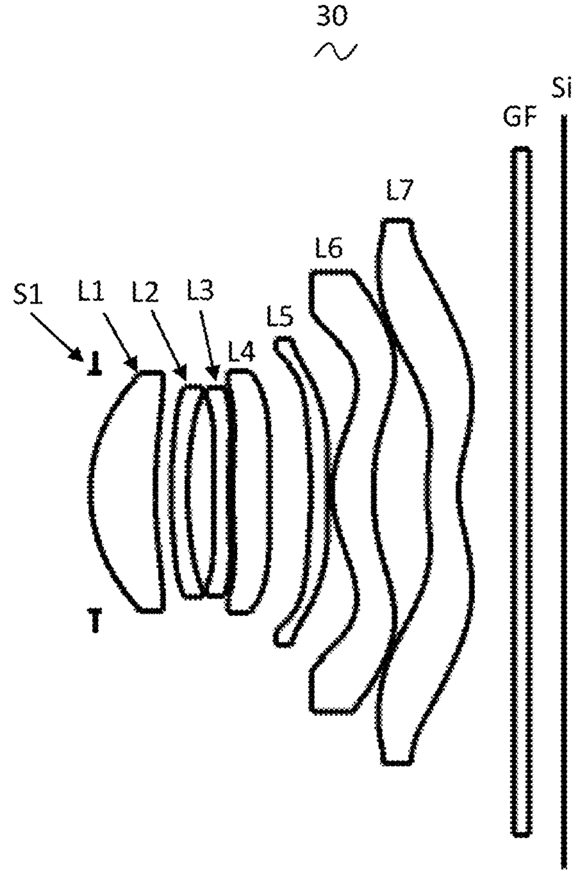
FIG. 9 is a structural schematic diagram of a camera optical lens according to Embodiment 3 of the present disclosure.

FIG. 9 shows a camera optical lens 30 according to Embodiment 3 of the present disclosure.

Table 5 and Table 6 show design data of the camera optical lens 30 according to the Embodiment 3 of the present disclosure.

TABLE 5

| | R | | d | | nd | | vd |
|---|---|---|---|---|---|---|---|
| S1 | ∞ | d0= | −0.097 | | | | |
| R1 | 3.429 | d1= | 1.375 | nd1 | 1.4959 | ν1 | 81.65 |
| R2 | 9.772 | d2= | 0.336 | | | | |
| R3 | 9.458 | d3= | 0.349 | nd2 | 1.6700 | ν2 | 19.39 |
| R4 | 7.534 | d4= | 0.559 | | | | |
| R5 | 53.281 | d5= | 0.319 | nd3 | 1.6700 | ν3 | 19.39 |
| R6 | 17.362 | d6= | 0.080 | | | | |
| R7 | 16.845 | d7= | 0.777 | nd4 | 1.5444 | ν4 | 55.82 |
| R8 | 1504.268 | d8= | 0.876 | | | | |
| R9 | −7.846 | d9= | 0.360 | nd5 | 1.5661 | ν5 | 37.71 |
| R10 | 20.107 | d10= | 0.094 | | | | |
| R11 | 2.230 | d11= | 0.874 | nd6 | 1.5346 | ν6 | 55.69 |
| R12 | 7.237 | d12= | 1.138 | | | | |
| R13 | 4.495 | d13= | 0.665 | nd7 | 1.5346 | ν7 | 55.69 |
| R14 | 2.378 | d14= | 1.183 | | | | |
| R15 | ∞ | d15= | 0.310 | ndg | 1.5168 | νg | 64.17 |
| R16 | ∞ | d16= | 0.738 | | | | |

Table 6 shows aspheric surface data of each lens in the camera optical lens 30 according to Embodiment 3 of the present disclosure.

TABLE 6

| | Conic Coefficient | Aspheric Coefficient | | | | |
|---|---|---|---|---|---|---|
| | k | A4 | A6 | A8 | A10 | A12 |
| R1 | 8.7358E−03 | 3.0265E−03 | −6.7264E−03 | 7.2001E−03 | −4.4400E−03 | 1.6548E−03 |
| R2 | −3.5044E−01 | −7.0781E−04 | −6.1905E−03 | 6.3366E−03 | −3.9217E−03 | 1.5283E−03 |
| R3 | 2.0151E−01 | −5.3427E−03 | −4.1666E−03 | 5.1864E−03 | −2.9984E−03 | 1.1333E−03 |
| R4 | −7.9811E−01 | −1.3707E−03 | −8.5815E−03 | 1.2940E−02 | −1.0518E−02 | 5.4692E−03 |
| R5 | 2.2353E+00 | −5.3456E−03 | −4.9989E−05 | −2.9546E−03 | 2.2446E−03 | −9.6352E−04 |
| R6 | −2.3029E−01 | −1.4267E−03 | 7.0364E−05 | −9.2901E−03 | 9.7439E−03 | −5.2527E−03 |
| R7 | −2.3718E+00 | 2.3837E−03 | −1.1283E−02 | 4.7045E−03 | −6.0657E−04 | −3.3866E−04 |
| R8 | 1.0000E+03 | −1.0307E−03 | −2.9147E−03 | −5.3336E−04 | 8.5342E−04 | −3.5476E−04 |
| R9 | −6.9487E+00 | 2.7107E−02 | −1.1375E−02 | 6.4570E−04 | 2.3321E−03 | −1.5321E−03 |
| R10 | −2.5424E+00 | −3.3092E−02 | −4.9444E−04 | 6.5171E−03 | −3.6587E−03 | 1.1243E−03 |
| R11 | −5.3400E+00 | 5.2024E−04 | −5.3450E−03 | 1.7033E−03 | −5.2521E−04 | 1.1500E−04 |
| R12 | −5.6901E−01 | 3.2010E−02 | −1.3718E−02 | 2.8998E−03 | −4.3372E−04 | 4.6373E−05 |
| R13 | −1.0078E+00 | −5.9079E−02 | 1.0294E−02 | −1.2382E−03 | 8.8635E−05 | −3.5567E−07 |
| R14 | −9.9412E−01 | −6.9100E−02 | 1.6451E−02 | −3.4017E−03 | 5.5547E−04 | −6.9006E−05 |

| | Conic Coefficient | Aspheric Coefficient | | | | |
|---|---|---|---|---|---|---|
| | k | A14 | A16 | A18 | A20 | A22 |
| R1 | 8.7358E−03 | −3.7992E−04 | 5.2451E−05 | −3.9935E−06 | 1.2875E−07 | 0.0000E+00 |
| R2 | −3.5044E−01 | −3.7464E−04 | 5.5842E−05 | −4.6137E−06 | 1.6179E−07 | 0.0000E+00 |
| R3 | 2.0151E−01 | −2.6616E−04 | 3.6346E−05 | −2.5276E−06 | 6.4045E−08 | 0.0000E+00 |
| R4 | −7.9811E−01 | −1.7918E−03 | 3.5837E−04 | −4.0109E−05 | 1.9342E−06 | 0.0000E+00 |
| R5 | 2.2353E+00 | 2.3429E−04 | −2.7928E−05 | 6.8362E−07 | 1.0463E−07 | 0.0000E+00 |
| R6 | −2.3029E−01 | 1.6657E−03 | −3.1140E−04 | 3.1727E−05 | −1.3541E−06 | 0.0000E+00 |
| R7 | −2.3718E+00 | 1.9405E−04 | −4.3553E−05 | 4.6726E−06 | −1.9594E−07 | 0.0000E+00 |
| R8 | 1.0000E+03 | 7.8790E−05 | −9.8296E−06 | 6.2566E−07 | −1.5008E−08 | 0.0000E+00 |
| R9 | −6.9487E+00 | 4.5932E−04 | −5.8156E−05 | −5.6955E−06 | 3.6198E−06 | −6.7957E−07 |
| R10 | −2.5424E+00 | −2.2043E−04 | 2.8258E−05 | −2.2849E−06 | 9.9743E−08 | −3.2831E−10 |
| R11 | −5.3400E+00 | −1.6379E−05 | 1.4757E−06 | −7.9845E−08 | 2.1953E−09 | −5.5237E−12 |
| R12 | −5.6901E−01 | −3.1841E−06 | 7.1362E−08 | 1.1284E−08 | −1.4823E−09 | 9.2105E−11 |
| R13 | −1.0078E+00 | −6.5153E−07 | 7.4722E−08 | −4.6700E−09 | 1.8905E−10 | −5.1264E−12 |
| R14 | −9.9412E−01 | 6.3898E−06 | −4.3583E−07 | 2.1748E−08 | −7.8814E−10 | 2.0460E−11 |

| | Conic Coefficient | Aspheric Coefficient | | | | |
|---|---|---|---|---|---|---|
| | k | A24 | A26 | A28 | A30 | / |
| R1 | 8.7358E−03 | 0.0000E+00 | 0.0000E+00 | 0.0000E+00 | 0.0000E+00 | / |
| R2 | −3.5044E−01 | 0.0000E+00 | 0.0000E+00 | 0.0000E+00 | 0.0000E+00 | / |
| R3 | 2.0151E−01 | 0.0000E+00 | 0.0000E+00 | 0.0000E+00 | 0.0000E+00 | / |
| R4 | −7.9811E−01 | 0.0000E+00 | 0.0000E+00 | 0.0000E+00 | 0.0000E+00 | / |
| R5 | 2.2353E+00 | 0.0000E+00 | 0.0000E+00 | 0.0000E+00 | 0.0000E+00 | / |
| R6 | −2.3029E−01 | 0.0000E+00 | 0.0000E+00 | 0.0000E+00 | 0.0000E+00 | / |
| R7 | −2.3718E+00 | 0.0000E+00 | 0.0000E+00 | 0.0000E+00 | 0.0000E+00 | / |
| R8 | 1.0000E+03 | 0.0000E+00 | 0.0000E+00 | 0.0000E+00 | 0.0000E+00 | / |
| R9 | −6.9487E+00 | 7.1390E−08 | −4.4638E−09 | 1.5564E−10 | −2.3375E−12 | / |
| R10 | −2.5424E+00 | −2.1154E−10 | 1.1263E−11 | −2.5149E−13 | 2.1020E−15 | / |
| R11 | −5.3400E+00 | −1.0886E−12 | 4.7393E−15 | 8.0029E−16 | −1.3220E−17 | / |
| R12 | −5.6901E−01 | −3.4813E−12 | 8.1510E−14 | −1.0932E−15 | 6.4502E−18 | / |
| R13 | −1.0078E+00 | 9.1385E−14 | −9.9960E−16 | 5.6897E−18 | −1.0268E−20 | / |
| R14 | −9.9412E−01 | −3.7028E−13 | 4.4347E−15 | −3.1589E−17 | 1.0135E−19 | / |

Figure 10:
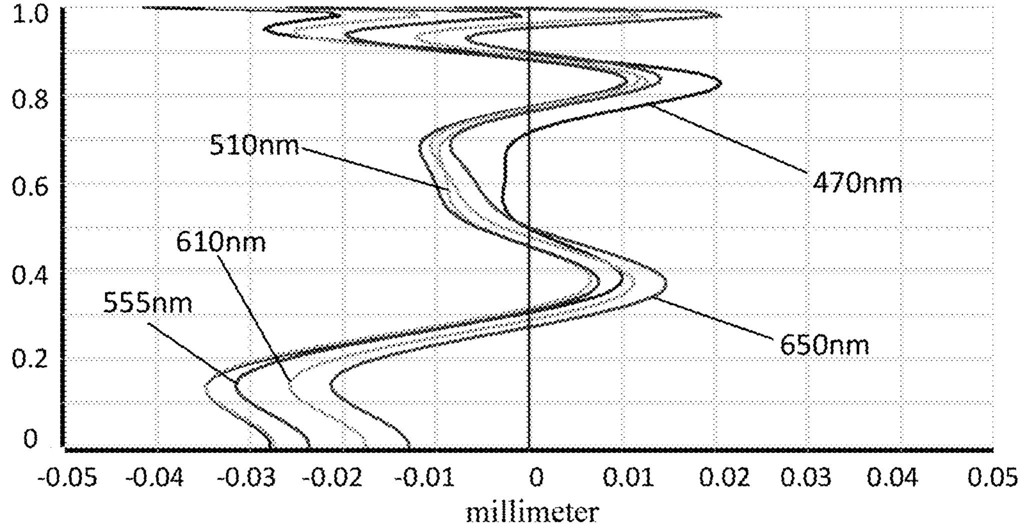
FIG. 10 is a schematic diagram of longitudinal aberration of the camera optical lens shown in FIG. 9.
Figure 11:
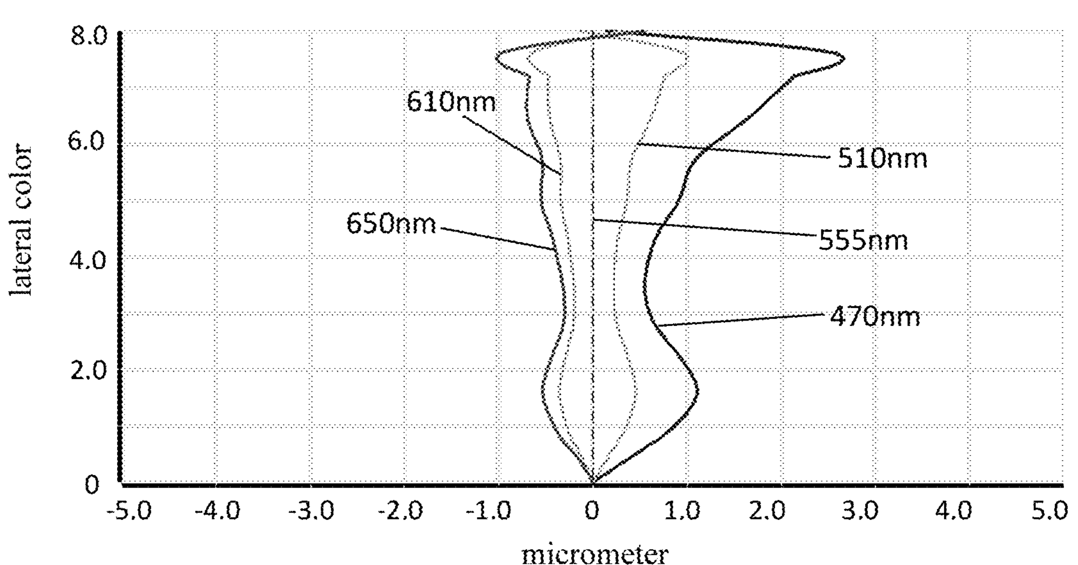
FIG. 11 is a schematic diagram of lateral color of the camera optical lens shown in FIG. 9.
Figure 12:
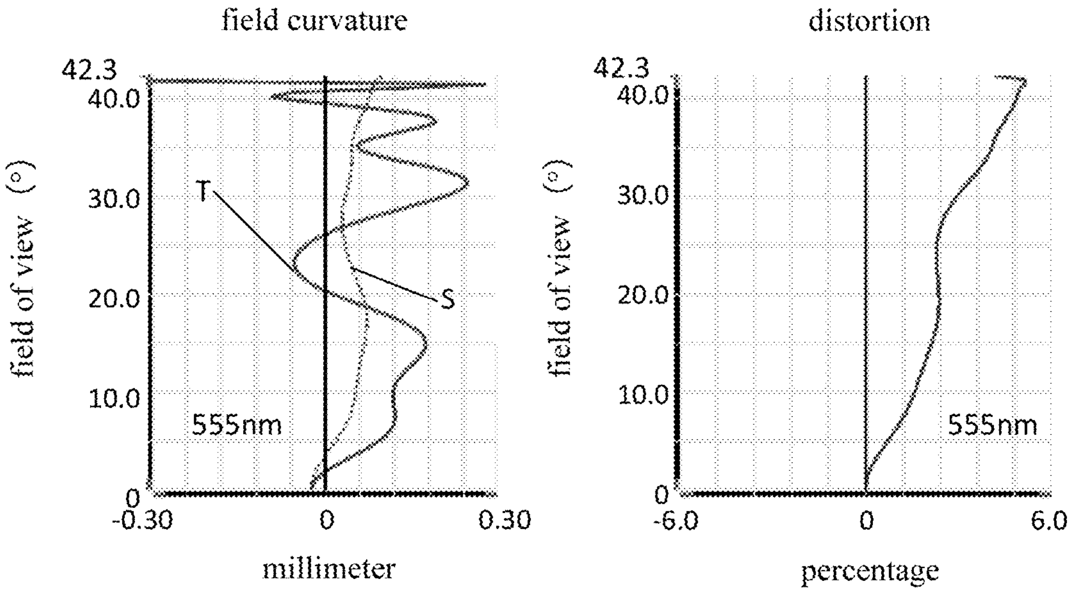
FIG. 12 is a schematic diagram of field curvature and distortion of the camera optical lens shown in FIG. 9.

FIG. 10 and FIG. 11 respectively show longitudinal aberration and lateral color of light with wavelengths of 650 nm, 610 nm, 555 nm, 510 nm, and 470 nm after passing through the camera optical lens 30 according to Embodiment 3. FIG. 12 shows field curvature and distortion of light with a wavelength of 555 nm after passing through the camera optical lens 30 according to Embodiment 3. The field curvature S in FIG. 12 is the field curvature in the sagittal direction, and T is the field curvature in the meridian direction.

In this embodiment, the entrance pupil diameter ENPD of the camera optical lens 30 is 5.061 mm, the full field of view (1.0 field of view) image height IH is 8.000 mm, the MIC field of view image height IH is 8.250 mm, the field of view FOV of the full field of view (1.0 field of view) in a diagonal direction is 84.53°, the field of view FOV of the MIC field of view in a diagonal direction is 85.64°, the camera optical lens 30 meets the design requirements of high relative illumination, wide angle, good processability, the on-axis and off-axis color aberrations are fully corrected. The camera optical lens 30 has excellent optical characteristics.

Embodiment 4

The meaning of the reference signs of Embodiment 4 is the same as that of Embodiment 1.

Figure 13:
FIG. 13 is a structural schematic diagram of a camera optical lens according to Embodiment 4 of the present disclosure.
Figure 13:
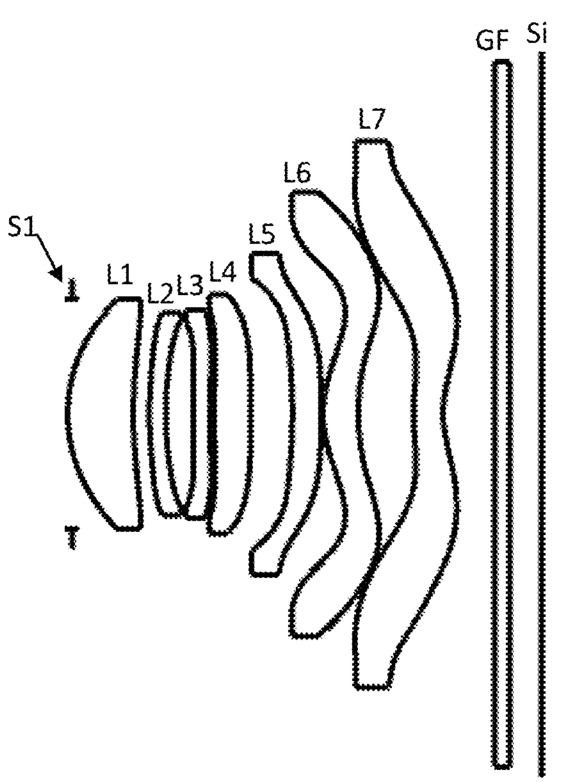

FIG. 13 shows a camera optical lens 40 according to Embodiment 4 of the present disclosure.

Table 7 and Table 8 show design data of the camera optical lens 40 according to Embodiment 4 of the present disclosure.

TABLE 7

| | R | | d | | nd | | vd |
|---|---|---|---|---|---|---|---|
| S1 | ∞ | d0= | −0.090 | | | | |
| R1 | 3.472 | d1= | 1.414 | nd1 | 1.4959 | v1 | 81.65 |
| R2 | 10.621 | d2= | 0.345 | | | | |
| R3 | 9.236 | d3= | 0.349 | nd2 | 1.6700 | v2 | 19.39 |
| R4 | 7.333 | d4= | 0.600 | | | | |
| R5 | 46.241 | d5= | 0.351 | nd3 | 1.6700 | v3 | 19.39 |
| R6 | 17.919 | d6= | 0.090 | | | | |
| R7 | 17.681 | d7= | 0.784 | nd4 | 1.5444 | v4 | 55.82 |
| R8 | −101.816 | d8= | 0.905 | | | | |
| R9 | −8.495 | d9= | 0.604 | nd5 | 1.5661 | v5 | 37.71 |
| R10 | 26.468 | d10= | 0.052 | | | | |
| R11 | 2.368 | d11= | 0.767 | nd6 | 1.5346 | v6 | 55.69 |
| R12 | 6.995 | d12= | 1.186 | | | | |
| R13 | 4.894 | d13= | 0.636 | nd7 | 1.5346 | v7 | 55.69 |
| R14 | 2.388 | d14= | 1.115 | | | | |
| R15 | ∞ | d15= | 0.310 | ndg | 1.5168 | vg | 64.17 |
| R16 | ∞ | d16= | 0.691 | | | | |

Table 8 shows aspheric surface data of each lens in the camera optical lens 40 according to Embodiment 4 of the present disclosure.

TABLE 8

| | Conic Coefficient | Aspheric Coefficient | | | | |
|---|---|---|---|---|---|---|
| | k | A4 | A6 | A8 | A10 | A12 |
| R1 | 3.9108E−02 | 2.9588E−03 | −7.0759E−03 | 7.3993E−03 | −4.3936E−03 | 1.5784E−03 |
| R2 | 1.4384E+00 | −1.3320E−03 | −5.3740E−03 | 5.9864E−03 | −3.7839E−03 | 1.4640E−03 |
| R3 | −5.1254E−01 | −5.5340E−03 | −3.6184E−03 | 4.7766E−03 | −2.9949E−03 | 1.2265E−03 |
| R4 | −9.1475E−02 | 1.6023E−05 | −1.1314E−02 | 1.5908E−02 | −1.2366E−02 | 5.9951E−03 |
| R5 | 9.7886E+01 | −7.6047E−03 | 6.5449E−03 | −9.1483E−03 | 5.7133E−03 | −2.1398E−03 |
| R6 | 1.1659E+01 | −5.3066E−03 | 7.8360E−03 | −1.6299E−02 | 1.3462E−02 | −6.3099E−03 |
| R7 | −8.4469E−01 | −2.5614E−03 | −5.0938E−03 | −2.9931E−04 | 2.1554E−03 | −1.2437E−03 |
| R8 | 1.0117E+03 | −2.3989E−03 | −1.2762E−03 | −1.8782E−03 | 1.4219E−03 | −4.4551E−04 |
| R9 | −1.2442E+00 | 2.7773E−02 | −1.4725E−02 | 2.8284E−03 | 1.5735E−03 | −1.3760E−03 |
| R10 | −2.8692E+01 | −3.1516E−02 | −1.6832E−03 | 6.9268E−03 | −3.7303E−03 | 1.1304E−03 |
| R11 | −6.2557E+00 | 7.3876E−03 | −6.2927E−03 | 1.9248E−03 | −5.5120E−04 | 1.1625E−04 |
| R12 | −1.1420E+00 | 3.0945E−02 | −1.3470E−02 | 2.8651E−03 | −4.3058E−04 | 4.6190E−05 |
| R13 | −1.0994E+00 | −5.7763E−02 | 9.8890E−03 | −1.1842E−03 | 8.5073E−05 | −2.5345E−07 |
| R14 | −9.9551E−01 | −6.7599E−02 | 1.6207E−02 | −3.3868E−03 | 5.5517E−04 | −6.9008E−05 |

| | Conic Coefficient | Aspheric Coefficient | | | | |
|---|---|---|---|---|---|---|
| | k | A14 | A16 | A18 | A20 | A22 |
| R1 | 3.9108E−02 | −3.5112E−04 | 4.7292E−05 | −3.5370E−06 | 1.1270E−07 | 0.0000E+00 |
| R2 | 1.4384E+00 | −3.5237E−04 | 5.1568E−05 | −4.2122E−06 | 1.4750E−07 | 0.0000E+00 |
| R3 | −5.1254E−01 | −3.1441E−04 | 4.8777E−05 | −4.1949E−06 | 1.5408E−07 | 0.0000E+00 |
| R4 | −9.1475E−02 | −1.8120E−03 | 3.3364E−04 | −3.4334E−05 | 1.5194E−06 | 0.0000E+00 |
| R5 | 9.7886E+01 | 4.5417E−04 | −4.4438E−05 | 1.4399E−07 | 2.0321E−07 | 0.0000E+00 |
| R6 | 1.1659E+01 | 1.7606E−03 | −2.8677E−04 | 2.5013E−05 | −8.9587E−07 | 0.0000E+00 |
| R7 | −8.4469E−01 | 3.3938E−04 | −4.6449E−05 | 2.6788E−06 | −2.3601E−08 | 0.0000E+00 |
| R8 | 1.0117E+03 | 6.9637E−05 | −4.4468E−06 | −7.7642E−08 | 1.6128E−08 | 0.0000E+00 |
| R9 | −1.2442E+00 | 4.4136E−04 | −5.7563E−05 | −5.5874E−06 | 3.6154E−06 | −6.8212E−07 |
| R10 | −2.8692E+01 | −2.2069E−04 | 2.8278E−05 | −2.2874E−06 | 9.9763E−08 | −3.1051E−10 |
| R11 | −6.2557E+00 | −1.6364E−05 | 1.4730E−06 | −7.9914E−08 | 2.2061E−09 | −5.6909E−12 |
| R12 | −1.1420E+00 | −3.1767E−06 | 7.0770E−08 | 1.1345E−08 | −1.4851E−09 | 9.2104E−11 |
| R13 | −1.0994E+00 | −6.5136E−07 | 7.4662E−08 | −4.6699E−09 | 1.8907E−10 | −5.1262E−12 |
| R14 | −9.9551E−01 | 6.3897E−06 | −4.3580E−07 | 2.1747E−08 | −7.8814E−10 | 2.0460E−11 |

| | Conic Coefficient | Aspheric Coefficient | | | | |
|---|---|---|---|---|---|---|
| | k | A24 | A26 | A28 | A30 | / |
| R1 | 3.9108E−02 | 0.0000E+00 | 0.0000E+00 | 0.0000E+00 | 0.0000E+00 | / |
| R2 | 1.4384E+00 | 0.0000E+00 | 0.0000E+00 | 0.0000E+00 | 0.0000E+00 | / |
| R3 | −5.1254E−01 | 0.0000E+00 | 0.0000E+00 | 0.0000E+00 | 0.0000E+00 | / |

TABLE 8-continued

| | | | | | | |
|---|---|---|---|---|---|---|
| R4 | −9.1475E−02 | 0.0000E+00 | 0.0000E+00 | 0.0000E+00 | 0.0000E+00 | / |
| R5 | 9.7886E+01 | 0.0000E+00 | 0.0000E+00 | 0.0000E+00 | 0.0000E+00 | / |
| R6 | 1.1659E+01 | 0.0000E+00 | 0.0000E+00 | 0.0000E+00 | 0.0000E+00 | / |
| R7 | −8.4469E−01 | 0.0000E+00 | 0.0000E+00 | 0.0000E+00 | 0.0000E+00 | / |
| R8 | 1.0117E+03 | 0.0000E+00 | 0.0000E+00 | 0.0000E+00 | 0.0000E+00 | / |
| R9 | −1.2442E+00 | 7.1732E−08 | −4.4705E−09 | 1.5434E−10 | −2.2709E−12 | / |
| R10 | −2.8692E+01 | −2.1304E−10 | 1.1329E−11 | −2.5378E−13 | 2.1527E−15 | / |
| R11 | −6.2557E+00 | −1.0998E−12 | 5.2099E−15 | 7.9315E−16 | −1.3185E−17 | / |
| R12 | −1.1420E+00 | −3.4777E−12 | 8.1476E−14 | −1.0963E−15 | 6.5148E−18 | / |
| R13 | −1.0994E+00 | 9.1400E−14 | −1.0000E−15 | 5.6762E−18 | −9.9560E−21 | / |
| R14 | −9.9551E−01 | −3.7029E−13 | 4.4349E−15 | −3.1591E−17 | 1.0137E−19 | / |

Figure 14:
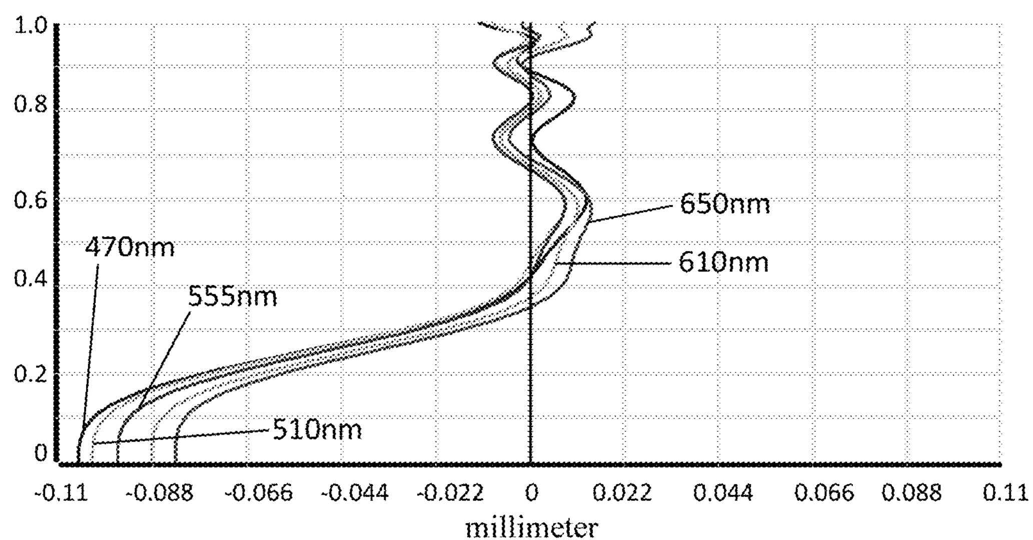
FIG. 14 is a schematic diagram of longitudinal aberration of the camera optical lens shown in FIG. 13.
Figure 15:
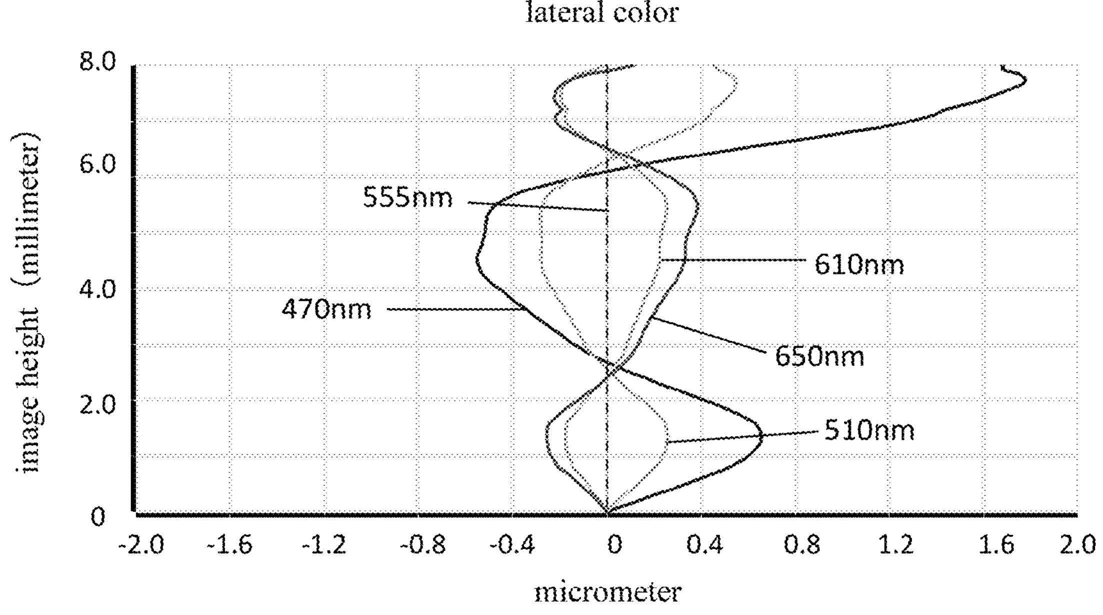
FIG. 15 is a schematic diagram of lateral color of the camera optical lens shown in FIG. 13.
Figure 16:
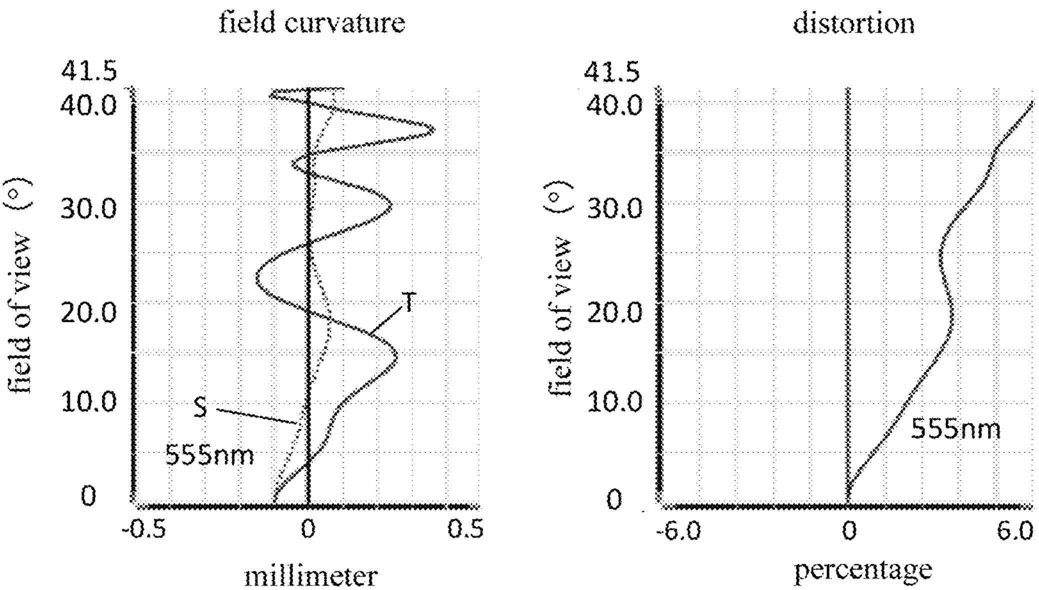
FIG. 16 is a schematic diagram of field curvature and distortion of the camera optical lens shown in FIG. 13.

FIG. 14 and FIG. 15 respectively show longitudinal aberration and lateral color of light with wavelengths of 650 nm, 610 nm, 555 nm, 510 nm, and 470 nm after passing through the camera optical lens 40 according to Embodiment 4. FIG. 16 shows field curvature and distortion of light with a wavelength of 555 nm after passing through the camera optical lens 40 according to Embodiment 4. The field curvature S in FIG. 16 is the field curvature in the sagittal direction, and T is the field curvature in the meridian direction.

In this embodiment, the entrance pupil diameter ENPD of the camera optical lens 40 is 5.077 mm, the full field of view (1.0 field of view) image height IH is 8.000 mm, the MIC field of view image height IH is 8.290 mm, the field of view FOV of the full field of view (1.0 field of view) in a diagonal direction is 83.00°, the field of view FOV of the MIC field of view in a diagonal direction is 84.97°, the camera optical lens 40 meets the design requirements of high relative illumination, wide angle, good processability, the on-axis and off-axis color aberrations are fully corrected. The camera optical lens 40 has excellent optical characteristics.

Embodiment 5

The meaning of the reference signs of Embodiment 5 is the same as that of Embodiment 1.

Figure 17:
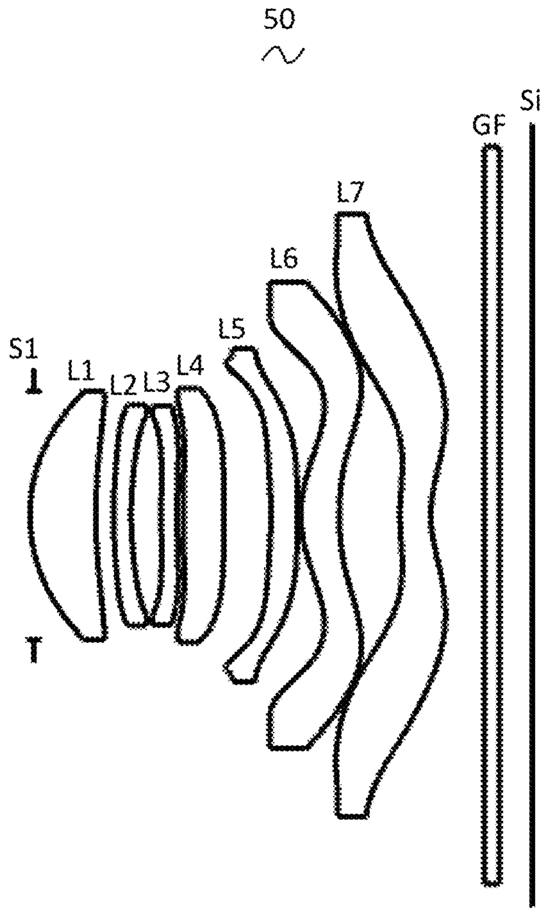
FIG. 17 is a structural schematic diagram of a camera optical lens according to Embodiment 5 of the present disclosure.

FIG. 17 shows a camera optical lens 50 according to Embodiment 5 of the present disclosure.

Table 9 and Table 10 show design data of the camera optical lens 50 according to Embodiment 5 of the present disclosure.

TABLE 9

| | R | | d | | nd | | vd |
|---|---|---|---|---|---|---|---|
| S1 | ∞ | d0= | −0.082 | | | | |
| R1 | 3.415 | d1= | 1.315 | nd1 | 1.4959 | ν1 | 81.65 |
| R2 | 10.081 | d2= | 0.359 | | | | |
| R3 | 9.746 | d3= | 0.351 | nd2 | 1.6700 | ν2 | 19.39 |
| R4 | 7.756 | d4= | 0.603 | | | | |
| R5 | 50.942 | d5= | 0.316 | nd3 | 1.6700 | ν3 | 19.39 |
| R6 | 18.728 | d6= | 0.120 | | | | |
| R7 | 18.825 | d7= | 0.816 | nd4 | 1.5444 | ν4 | 55.82 |
| R8 | −72.901 | d8= | 0.941 | | | | |
| R9 | −8.446 | d9= | 0.519 | nd5 | 1.5661 | ν5 | 37.71 |
| R10 | 27.238 | d10= | 0.078 | | | | |
| R11 | 2.372 | d11= | 0.776 | nd6 | 1.5346 | ν6 | 55.69 |
| R12 | 7.143 | d12= | 1.212 | | | | |
| R13 | 5.103 | d13= | 0.614 | nd7 | 1.5346 | ν7 | 55.69 |
| R14 | 2.348 | d14= | 1.064 | | | | |
| R15 | ∞ | d15= | 0.310 | ndg | 1.5168 | νg | 64.17 |
| R16 | ∞ | d16= | 0.658 | | | | |

Table 10 shows aspherical surface data of each lens in the camera optical lens 50 according to Embodiment 5 of the present disclosure.

TABLE 10

| | Conic Coefficient | Aspheric Coefficient | | | | |
|---|---|---|---|---|---|---|
| | k | A4 | A6 | A8 | A10 | A12 |
| R1 | 8.7201E−03 | 2.9166E−03 | −6.6985E−03 | 7.2005E−03 | −4.4397E−03 | 1.6548E−03 |
| R2 | 3.7317E−01 | −8.7450E−04 | −6.1455E−03 | 6.3416E−03 | −3.9214E−03 | 1.5286E−03 |
| R3 | 1.7582E−02 | −6.0309E−03 | −4.1581E−03 | 5.1998E−03 | −2.9975E−03 | 1.1335E−03 |
| R4 | −2.5094E−02 | −1.4187E−03 | −8.6527E−03 | 1.2940E−02 | −1.0519E−02 | 5.4700E−03 |
| R5 | 1.4319E−01 | −4.9227E−03 | −1.0543E−04 | −2.9563E−03 | 2.2440E−03 | −9.6515E−04 |
| R6 | −4.4189E−01 | −1.4380E−03 | 2.5023E−05 | −9.2864E−03 | 9.7441E−03 | −5.2526E−03 |
| R7 | −7.2753E−01 | 2.6125E−03 | −1.1274E−02 | 4.7199E−03 | −6.0564E−04 | −3.3892E−04 |
| R8 | −2.2446E+02 | −8.3062E−04 | −2.9272E−03 | −5.4738E−04 | 8.5408E−04 | −3.5474E−04 |
| R9 | −1.2690E+00 | 2.6214E−02 | −1.1383E−02 | 6.5674E−04 | 2.3319E−03 | −1.5321E−03 |
| R10 | −8.2630E+00 | −3.2953E−02 | −4.9241E−04 | 6.5171E−03 | −3.6587E−03 | 1.1243E−03 |
| R11 | −5.8692E+00 | 4.9506E−03 | −5.3257E−03 | 1.7037E−03 | −5.2526E−04 | 1.1499E−04 |
| R12 | −9.1291E−01 | 3.1836E−02 | −1.3715E−02 | 2.8998E−03 | −4.3373E−04 | 4.6373E−05 |
| R13 | −9.1704E−01 | −5.9040E−02 | 1.0294E−02 | −1.2381E−03 | 8.8635E−05 | −3.5568E−07 |
| R14 | −9.9991E−01 | −6.9155E−02 | 1.6449E−02 | −3.4017E−03 | 5.5547E−04 | −6.9006E−05 |

| | Conic Coefficient | Aspheric Coefficient | | | | |
|---|---|---|---|---|---|---|
| | k | A14 | A16 | A18 | A20 | A22 |
| R1 | 8.7201E−03 | −3.7992E−04 | 5.2451E−05 | −3.9931E−06 | 1.2875E−07 | 0.0000E+00 |
| R2 | 3.7317E−01 | −3.7465E−04 | 5.5843E−05 | −4.6145E−06 | 1.6175E−07 | 0.0000E+00 |
| R3 | 1.7582E−02 | −2.6609E−04 | 3.6358E−05 | −2.5297E−06 | 6.3308E−08 | 0.0000E+00 |
| R4 | −2.5094E−02 | −1.7914E−03 | 3.5838E−04 | −4.0106E−05 | 1.9332E−06 | 0.0000E+00 |
| R5 | 1.4319E−01 | 2.3441E−04 | −2.7939E−05 | 6.8793E−07 | 1.0479E−07 | 0.0000E+00 |

TABLE 10-continued

| | | | | | | |
|---|---|---|---|---|---|---|
| R6 | −4.4189E−01 | 1.6656E−03 | −3.1141E−04 | 3.1726E−05 | −1.3545E−06 | 0.0000E+00 |
| R7 | −7.2753E−01 | 1.9399E−04 | −4.3523E−05 | 4.6793E−06 | −1.9728E−07 | 0.0000E+00 |
| R8 | −2.2446E+02 | 7.8797E−05 | −9.8253E−06 | 6.2567E−07 | −1.5060E−08 | 0.0000E+00 |
| R9 | −1.2690E+00 | 4.5932E−04 | −5.8156E−05 | −5.6955E−06 | 3.6198E−06 | −6.7957E−07 |
| R10 | −8.2630E+00 | −2.2043E−04 | 2.8258E−05 | −2.2849E−06 | 9.9742E−08 | −3.2833E−10 |
| R11 | −5.8692E+00 | −1.6380E−05 | 1.4757E−06 | −7.9845E−08 | 2.1954E−09 | −5.5210E−12 |
| R12 | −9.1291E−01 | −3.1841E−06 | 7.1361E−08 | 1.1284E−08 | −1.4823E−09 | 9.2105E−11 |
| R13 | −9.1704E−01 | −6.5153E−07 | 7.4722E−08 | −4.6700E−09 | 1.8905E−10 | −5.1264E−12 |
| R14 | −9.9991E−01 | 6.3898E−06 | −4.3583E−07 | 2.1748E−08 | −7.8814E−10 | 2.0460E−11 |

| | Conic Coefficient | Aspheric Coefficient | | | | |
|---|---|---|---|---|---|---|
| | k | A24 | A26 | A28 | A30 | / |
| R1 | 8.7201E−03 | 0.0000E+00 | 0.0000E+00 | 0.0000E+00 | 0.0000E+00 | / |
| R2 | 3.7317E−01 | 0.0000E+00 | 0.0000E+00 | 0.0000E+00 | 0.0000E+00 | / |
| R3 | 1.7582E−02 | 0.0000E+00 | 0.0000E+00 | 0.0000E+00 | 0.0000E+00 | / |
| R4 | −2.5094E−02 | 0.0000E+00 | 0.0000E+00 | 0.0000E+00 | 0.0000E+00 | / |
| R5 | 1.4319E−01 | 0.0000E+00 | 0.0000E+00 | 0.0000E+00 | 0.0000E+00 | / |
| R6 | −4.4189E−01 | 0.0000E+00 | 0.0000E+00 | 0.0000E+00 | 0.0000E+00 | / |
| R7 | −7.2753E−01 | 0.0000E+00 | 0.0000E+00 | 0.0000E+00 | 0.0000E+00 | / |
| R8 | −2.2446E+02 | 0.0000E+00 | 0.0000E+00 | 0.0000E+00 | 0.0000E+00 | / |
| R9 | −1.2690E+00 | 7.1390E−08 | −4.4638E−09 | 1.5564E−10 | −2.3375E−12 | / |
| R10 | −8.2630E+00 | −2.1154E−10 | 1.1263E−11 | −2.5144E−13 | 2.1030E−15 | / |
| R11 | −5.8692E+00 | −1.0885E−12 | 4.7444E−15 | 7.9965E−16 | −1.3304E−17 | / |
| R12 | −9.1291E−01 | −3.4813E−12 | 8.1510E−14 | −1.0932E−15 | 6.4502E−18 | / |
| R13 | −9.1704E−01 | 9.1385E−14 | −9.9959E−16 | 5.6897E−18 | −1.0270E−20 | / |
| R14 | −9.9991E−01 | −3.7028E−13 | 4.4347E−15 | −3.1589E−17 | 1.0135E−19 | / |

Figure 18:
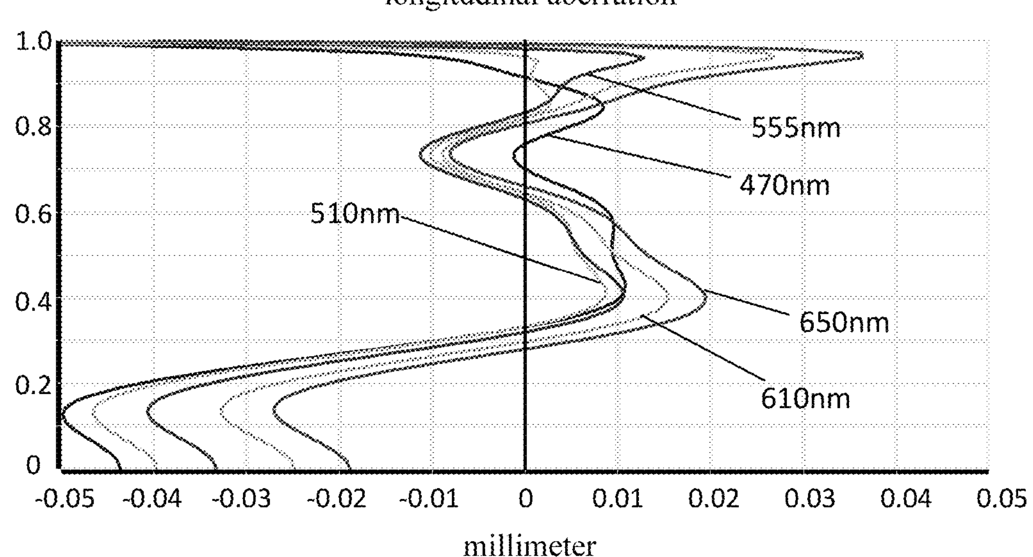
FIG. 18 is a schematic diagram of longitudinal aberration of the camera optical lens shown in FIG. 17.
Figure 19:
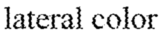
FIG. 19 is a schematic diagram of lateral color of the camera optical lens shown in FIG. 17.
Figure 19:
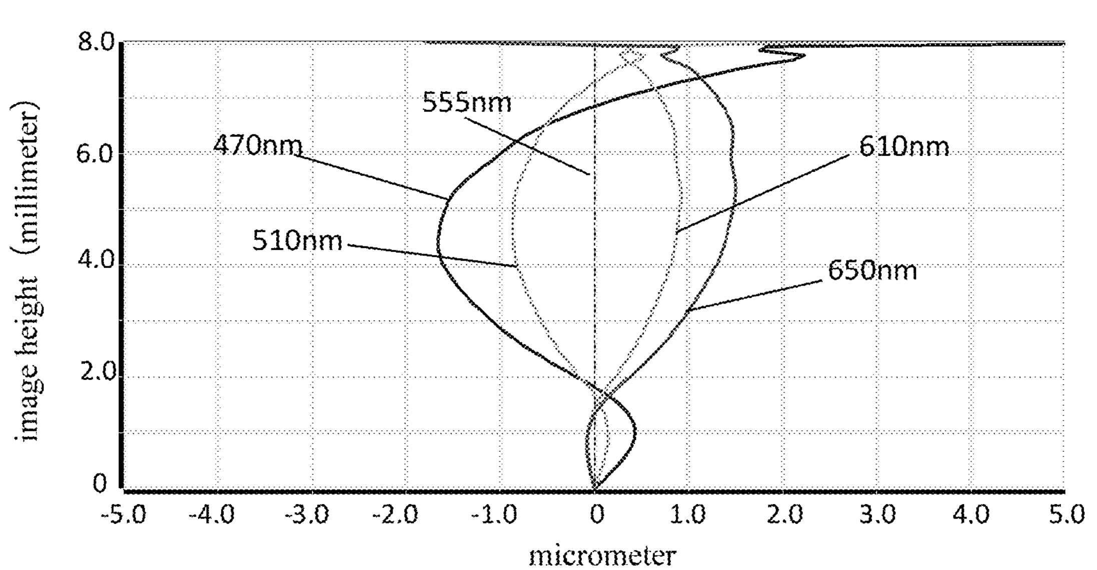
Figure 20:
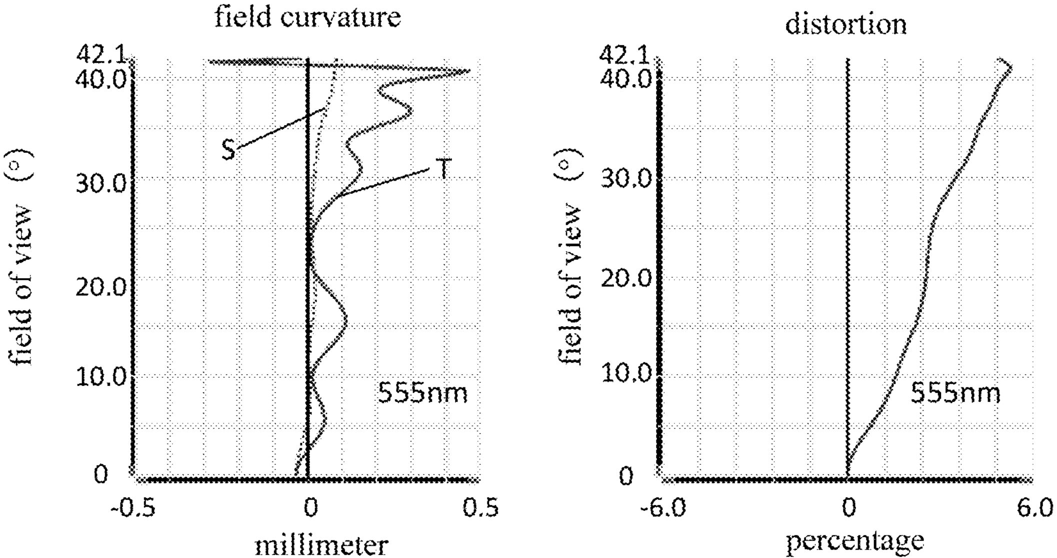
FIG. 20 is a schematic diagram of field curvature and distortion of the camera optical lens shown in FIG. 17.

FIG. 18 and FIG. 19 respectively show longitudinal aberration and lateral color of light with wavelengths of 650 nm, 610 nm, 555 nm, 510 nm, and 470 nm after passing through the camera optical lens 50 according to Embodiment 5. FIG. 20 shows field curvature and distortion of light with a wavelength of 555 nm after passing through the camera optical lens 50 according to Embodiment 5. The field curvature S in FIG. 20 is the field curvature in the sagittal direction, and T is the field curvature in the meridian direction.

In this embodiment, the entrance pupil diameter ENPD of the camera optical lens 50 is 5.094 mm, the full field of view (1.0 field of view) image height IH is 8.000 mm, the MIC field of view image height IH is 8.250 mm, the field of view FOV of the full field of view (1.0 field of view) in a diagonal direction is 84.17°, the field of view FOV of the MIC field of view in a diagonal direction is 85.32°, the camera optical lens 50 meets the design requirements of high relative illumination, wide angle, good processability, the on-axis and off-axis color aberrations are fully corrected. The camera optical lens 50 has excellent optical characteristics.

Embodiment 6

The meaning of the reference signs of Embodiment 6 is the same as that of Embodiment 1.

Figure 21:
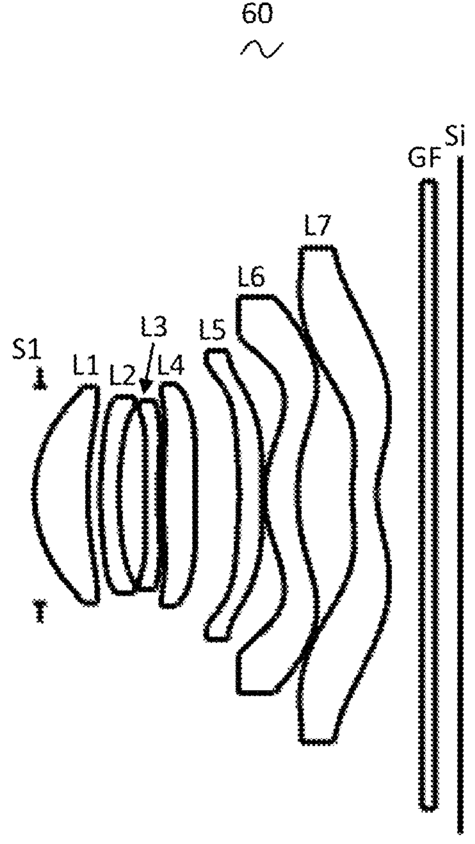
FIG. 21 is a structural schematic diagram of a camera optical lens according to Embodiment 6 of the present disclosure.

FIG. 21 shows a camera optical lens 60 according to Embodiment 6 of the present disclosure.

Table 11 and Table 12 show design data of the camera optical lens 60 according to Embodiment 6 of the present disclosure.

TABLE 11

| | R | | d | | nd | | vd |
|---|---|---|---|---|---|---|---|
| S1 | ∞ | d0= | −0.121 | | | | |
| R1 | 3.216 | d1= | 1.231 | nd1 | 1.4959 | v1 | 81.65 |
| R2 | 6.936 | d2= | 0.299 | | | | |
| R3 | 8.953 | d3= | 0.434 | nd2 | 1.6700 | v2 | 19.39 |
| R4 | 8.251 | d4= | 0.608 | | | | |
| R5 | 37.503 | d5= | 0.309 | nd3 | 1.6700 | v3 | 19.39 |
| R6 | 15.669 | d6= | 0.102 | | | | |
| R7 | 13.578 | d7= | 0.758 | nd4 | 1.5444 | v4 | 55.82 |
| R8 | −292.571 | d8= | 1.009 | | | | |
| R9 | −8.712 | d9= | 0.532 | nd5 | 1.5661 | v5 | 37.71 |
| R10 | 22.099 | d10= | 0.058 | | | | |
| R11 | 2.381 | d11= | 0.778 | nd6 | 1.5346 | v6 | 55.69 |
| R12 | 7.180 | d12= | 1.266 | | | | |
| R13 | 5.206 | d13= | 0.570 | nd7 | 1.5346 | v7 | 55.69 |
| R14 | 2.371 | d14= | 1.039 | | | | |
| R15 | ∞ | d15= | 0.310 | ndg | 1.5168 | vg | 64.17 |
| R16 | ∞ | d16= | 0.597 | | | | |

Table 12 shows aspherical surface data of each lens in the camera optical lens 60 according to Embodiment 6 of the present disclosure.

TABLE 12

| | Conic Coefficient | Aspheric Coefficient | | | | |
|---|---|---|---|---|---|---|
| | k | A4 | A6 | A8 | A10 | A12 |
| R1 | −8.3511E−03 | 3.0416E−03 | −6.7559E−03 | 7.2193E−03 | −4.4401E−03 | 1.6540E−03 |
| R2 | −2.2386E+00 | −1.8325E−03 | −6.2056E−03 | 6.3455E−03 | −3.9221E−03 | 1.5284E−03 |
| R3 | 1.7272E−01 | −6.3628E−03 | −4.3027E−03 | 5.2292E−03 | −2.9937E−03 | 1.1338E−03 |

TABLE 12-continued

| | | | | | | |
|---|---|---|---|---|---|---|
| R4 | 8.5597E−02 | −5.4747E−04 | −8.3907E−03 | 1.2964E−02 | −1.0518E−02 | 5.4717E−03 |
| R5 | 3.6755E+01 | −5.5259E−03 | 6.5691E−05 | −2.9663E−03 | 2.2339E−03 | −9.6245E−04 |
| R6 | −2.1039E−01 | −1.6668E−03 | 9.1960E−07 | −9.2854E−03 | 9.7427E−03 | −5.2528E−03 |
| R7 | 4.3121E+00 | 3.4124E−03 | −1.1613E−02 | 4.8174E−03 | −6.1469E−04 | −3.4149E−04 |
| R8 | −4.3231E+02 | −8.6109E−04 | −2.6609E−03 | −5.6849E−04 | 8.5378E−04 | −3.5439E−04 |
| R9 | −1.4475E+00 | 2.5904E−02 | −1.1283E−02 | 6.6257E−04 | 2.3310E−03 | −1.5321E−03 |
| R10 | −6.4014E−01 | −3.2741E−02 | −5.3351E−04 | 6.5169E−03 | −3.6586E−03 | 1.1243E−03 |
| R11 | −6.1029E+00 | 5.0011E−03 | −5.3393E−03 | 1.7030E−03 | −5.2540E−04 | 1.1499E−04 |
| R12 | −9.3995E−01 | 3.1814E−02 | −1.3705E−02 | 2.9000E−03 | −4.3374E−04 | 4.6372E−05 |
| R13 | −9.4649E−01 | −5.9012E−02 | 1.0307E−02 | −1.2382E−03 | 8.8628E−05 | −3.5568E−07 |
| R14 | −9.9947E−01 | −6.9118E−02 | 1.6454E−02 | −3.4015E−03 | 5.5547E−04 | −6.9006E−05 |

| | Conic Coefficient | Aspheric Coefficient | | | | |
|---|---|---|---|---|---|---|
| | k | A14 | A16 | A18 | A20 | A22 |
| R1 | −8.3511E−03 | −3.7991E−04 | 5.2454E−05 | −3.9931E−06 | 1.2843E−07 | 0.0000E+00 |
| R2 | −2.2386E+00 | −3.7463E−04 | 5.5844E−05 | −4.6149E−06 | 1.6150E−07 | 0.0000E+00 |
| R3 | 1.7272E−01 | −2.6615E−04 | 3.6347E−05 | −2.5327E−06 | 6.4026E−08 | 0.0000E+00 |
| R4 | 8.5597E−02 | −1.7916E−03 | 3.5836E−04 | −4.0108E−05 | 1.9373E−06 | 0.0000E+00 |
| R5 | 3.6755E+01 | 2.3482E−04 | −2.8007E−05 | 6.4581E−07 | 1.1424E−07 | 0.0000E+00 |
| R6 | −2.1039E−01 | 1.6659E−03 | −3.1139E−04 | 3.1725E−05 | −1.3534E−06 | 0.0000E+00 |
| R7 | 4.3121E+00 | 1.9442E−04 | −4.3447E−05 | 4.6733E−06 | −1.9785E−07 | 0.0000E+00 |
| R8 | −4.3231E+02 | 7.8734E−05 | −9.8220E−06 | 6.2615E−07 | −1.5136E−08 | 0.0000E+00 |
| R9 | −1.4475E+00 | 4.5933E−04 | −5.8154E−05 | −5.6955E−06 | 3.6198E−06 | −6.7957E−07 |
| R10 | −6.4014E−01 | −2.2043E−04 | 2.8258E−05 | −2.2849E−06 | 9.9742E−08 | −3.2828E−10 |
| R11 | −6.1029E+00 | −1.6379E−05 | 1.4757E−06 | −7.9847E−08 | 2.1953E−09 | −5.5245E−12 |
| R12 | −9.3995E−01 | −3.1841E−06 | 7.1361E−08 | 1.1284E−08 | −1.4823E−09 | 9.2105E−11 |
| R13 | −9.4649E−01 | −6.5153E−07 | 7.4722E−08 | −4.6700E−09 | 1.8905E−10 | −5.1264E−12 |
| R14 | −9.9947E−01 | 6.3898E−06 | −4.3583E−07 | 2.1748E−08 | −7.8814E−10 | 2.0460E−11 |

| | Conic Coefficient | Aspheric Coefficient | | | | |
|---|---|---|---|---|---|---|
| | k | A24 | A26 | A28 | A30 | / |
| R1 | −8.3511E−03 | 0.0000E+00 | 0.0000E+00 | 0.0000E+00 | 0.0000E+00 | / |
| R2 | −2.2386E+00 | 0.0000E+00 | 0.0000E+00 | 0.0000E+00 | 0.0000E+00 | / |
| R3 | 1.7272E−01 | 0.0000E+00 | 0.0000E+00 | 0.0000E+00 | 0.0000E+00 | / |
| R4 | 8.5597E−02 | 0.0000E+00 | 0.0000E+00 | 0.0000E+00 | 0.0000E+00 | / |
| R5 | 3.6755E+01 | 0.0000E+00 | 0.0000E+00 | 0.0000E+00 | 0.0000E+00 | / |
| R6 | −2.1039E−01 | 0.0000E+00 | 0.0000E+00 | 0.0000E+00 | 0.0000E+00 | / |
| R7 | 4.3121E+00 | 0.0000E+00 | 0.0000E+00 | 0.0000E+00 | 0.0000E+00 | / |
| R8 | −4.3231E+02 | 0.0000E+00 | 0.0000E+00 | 0.0000E+00 | 0.0000E+00 | / |
| R9 | −1.4475E+00 | 7.1389E−08 | −4.4638E−09 | 1.5564E−10 | −2.3377E−12 | / |
| R10 | −6.4014E−01 | −2.1154E−10 | 1.1263E−11 | −2.5144E−13 | 2.1035E−15 | / |
| R11 | −6.1029E+00 | −1.0888E−12 | 4.7541E−15 | 8.0130E−16 | −1.3079E−17 | / |
| R12 | −9.3995E−01 | −3.4813E−12 | 8.1510E−14 | −1.0932E−15 | 6.4497E−18 | / |
| R13 | −9.4649E−01 | 9.1385E−14 | −9.9959E−16 | 5.6897E−18 | −1.0268E−20 | / |
| R14 | −9.9947E−01 | −3.7028E−13 | 4.4347E−15 | −3.1589E−17 | 1.0135E−19 | / |

Figure 22:
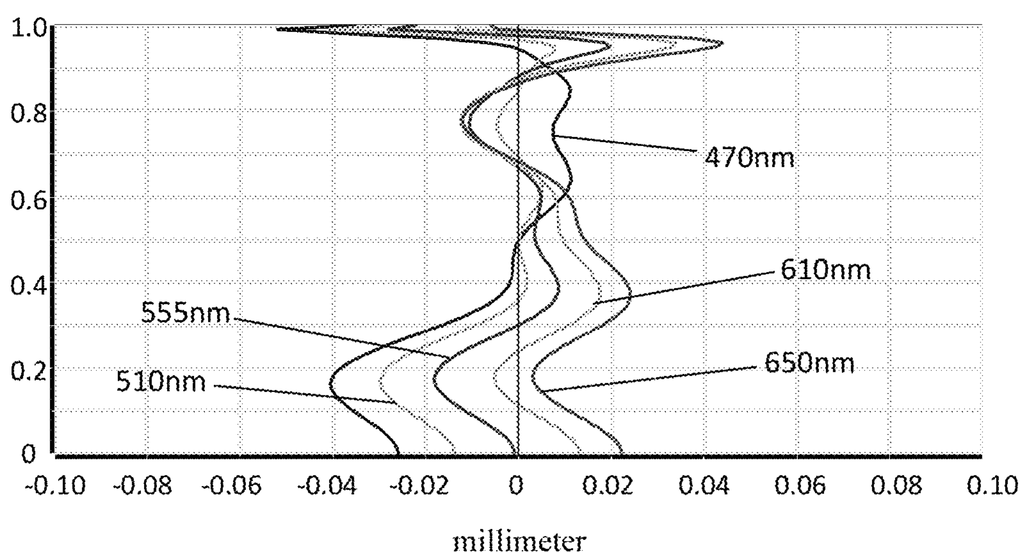
FIG. 22 is a schematic diagram of longitudinal aberration of the camera optical lens shown in FIG. 21.
Figure 23:
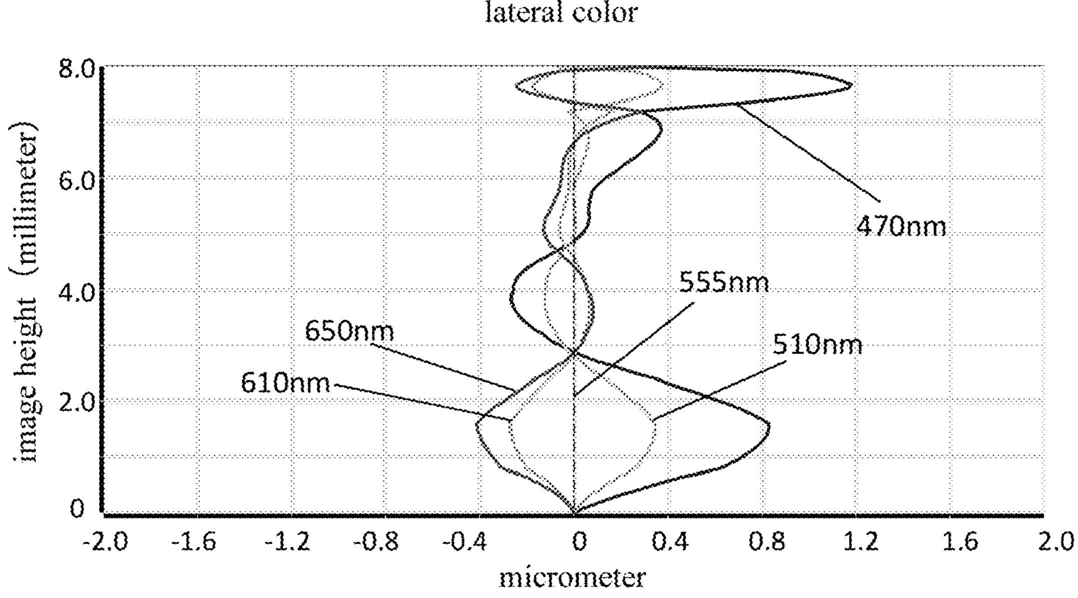
FIG. 23 is a schematic diagram of lateral color of the camera optical lens shown in FIG. 21.
Figure 24:
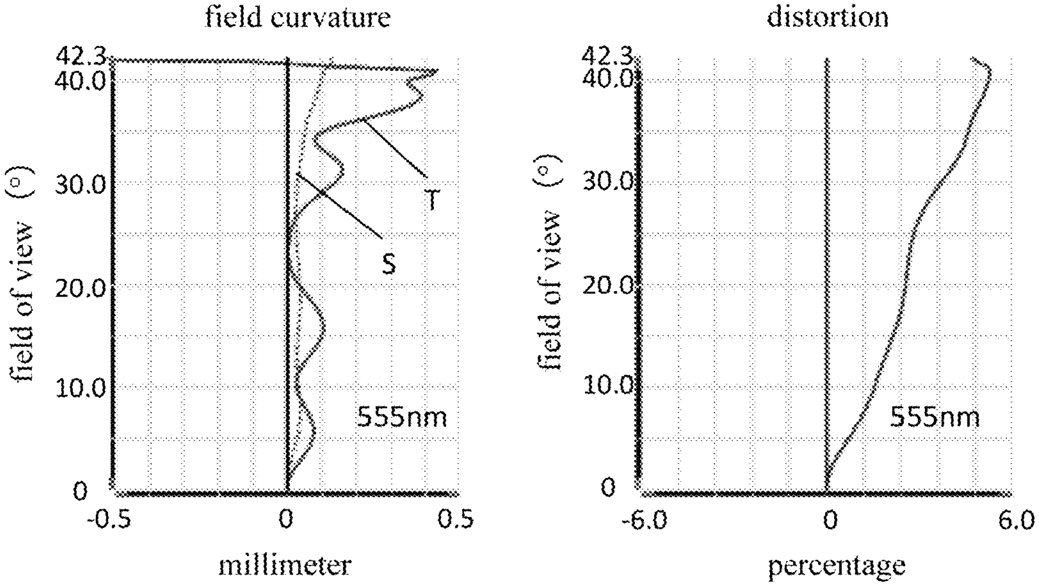
FIG. 24 is a schematic diagram of field curvature and distortion of the camera optical lens shown in FIG. 21.

FIG. 22 and FIG. 23 respectively show longitudinal aberration and lateral color of light with wavelengths of 650 nm, 610 nm, 555 nm, 510 nm, and 470 nm after passing through the camera optical lens 60 according to Embodiment 6. FIG. 24 shows field curvature and distortion of light with a wavelength of 555 nm after passing through the camera optical lens 60 according to Embodiment 6. The field curvature S in FIG. 24 is the field curvature in a sagittal direction, and T is the field curvature in a meridian direction.

In this embodiment, the entrance pupil diameter ENPD of the camera optical lens 60 is 5.088 mm, the full field of view (1.0 field of view) image height IH is 8.000 mm, the MIC field of view image height IH is 8.250 mm, the field of view FOV of the full field of view (1.0 field of view) in a diagonal direction is 84.75°, the field of view FOV of the MIC field of view in a diagonal direction is 86.48°, the camera optical lens 60 meets the design requirements of high relative illumination, wide angle, good processability, the on-axis and off-axis color aberrations are fully corrected. The camera optical lens 60 has excellent optical characteristics.

Embodiment 7

The meaning of the reference signs of Embodiment 7 is the same as that of Embodiment 1.

Figure 25:
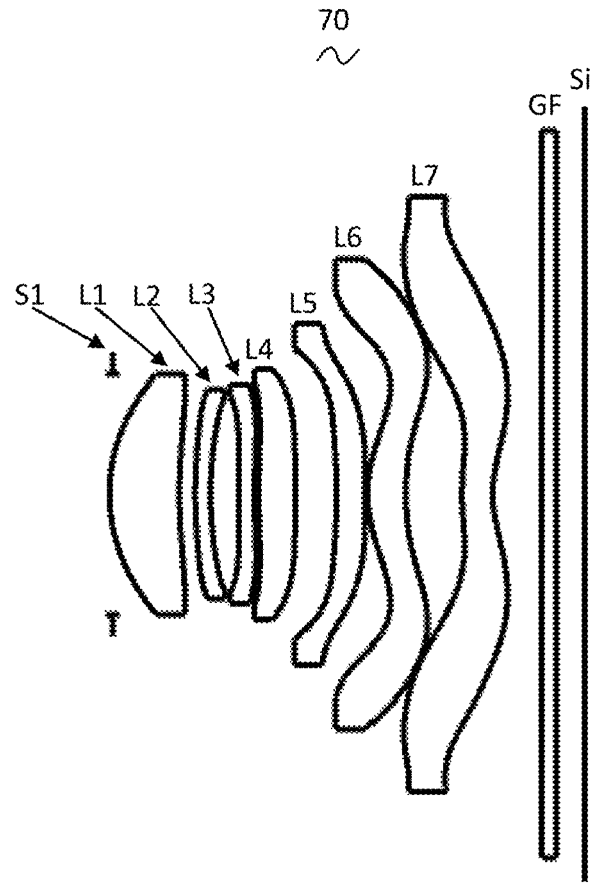
FIG. 25 is a structural schematic diagram of a camera optical lens according to Embodiment 7 of the present disclosure.

FIG. 25 shows a camera optical lens 70 according to Embodiment 7 of the present disclosure.

Table 13 and Table 14 show design data of the camera optical lens 70 according to Embodiment 7 of the present disclosure.

TABLE 13

| | R | | d | | nd | | νd |
|---|---|---|---|---|---|---|---|
| S1 | ∞ | d0= | −0.068 | | | | |
| R1 | 3.489 | d1= | 1.465 | nd1 | 1.4959 | ν1 | 81.65 |
| R2 | 11.216 | d2= | 0.329 | | | | |
| R3 | 9.508 | d3= | 0.321 | nd2 | 1.6700 | ν2 | 19.39 |
| R4 | 7.515 | d4= | 0.584 | | | | |
| R5 | 43.572 | d5= | 0.334 | nd3 | 1.6700 | ν3 | 19.39 |
| R6 | 16.957 | d6= | 0.086 | | | | |
| R7 | 16.647 | d7= | 0.766 | nd4 | 1.5444 | ν4 | 55.82 |
| R8 | −115.067 | d8= | 0.869 | | | | |
| R9 | −8.625 | d9= | 0.590 | nd5 | 1.5661 | ν5 | 37.71 |
| R10 | 28.306 | d10= | 0.049 | | | | |
| R11 | 2.378 | d11= | 0.807 | nd6 | 1.5346 | ν6 | 55.69 |
| R12 | 7.027 | d12= | 1.170 | | | | |
| R13 | 4.881 | d13= | 0.642 | nd7 | 1.5346 | ν7 | 55.69 |

TABLE 13-continued

| | R | | d | | nd | | vd |
|---|---|---|---|---|---|---|---|
| R14 | 2.310 | d14= | 1.022 | | | | |
| R15 | ∞ | d15= | 0.310 | ndg | 1.5168 | vg | 64.17 |
| R16 | ∞ | d16= | 0.600 | | | | |

Table 14 shows aspherical surface data of each lens in the camera optical lens 70 according to Embodiment 7 of the present disclosure.

TABLE 18

| | Conic Coefficient | Aspheric Coefficient | | | | |
|---|---|---|---|---|---|---|
| | k | A4 | A6 | A8 | A10 | A12 |
| R1 | −1.1963E−02 | 2.9246E−03 | −6.7658E−03 | 7.1966E−03 | −4.4397E−03 | 1.6547E−03 |
| R2 | −2.8701E−01 | −9.1927E−04 | −6.2161E−03 | 6.3331E−03 | −3.9223E−03 | 1.5284E−03 |
| R3 | −5.0321E−01 | −5.2520E−03 | −4.1338E−03 | 5.1929E−03 | −2.9968E−03 | 1.1335E−03 |
| R4 | 6.1927E−01 | −1.4202E−03 | −8.6442E−03 | 1.2941E−02 | −1.0516E−02 | 5.4695E−03 |
| R5 | −1.1890E+00 | −5.4402E−03 | −4.2085E−05 | −2.9564E−03 | 2.2433E−03 | −9.6369E−04 |
| R6 | −3.5147E−02 | −1.4970E−03 | 6.6637E−05 | −9.2926E−03 | 9.7429E−03 | −5.2525E−03 |
| R7 | −1.8464E+00 | 2.5477E−03 | −1.1241E−02 | 4.7049E−03 | −6.0675E−04 | −3.3839E−04 |
| R8 | −9.9764E+01 | −1.4406E−03 | −2.9109E−03 | −5.3890E−04 | 8.5316E−04 | −3.5467E−04 |
| R9 | −5.8338E−01 | 2.5887E−02 | −1.1367E−02 | 6.4915E−04 | 2.3319E−03 | −1.5321E−03 |
| R10 | −6.4647E+00 | −3.3122E−02 | −4.8687E−04 | 6.5174E−03 | −3.6587E−03 | 1.1243E−03 |
| R11 | −5.9567E+00 | 5.3324E−03 | −5.3497E−03 | 1.7037E−03 | −5.2520E−04 | 1.1500E−04 |
| R12 | −8.9563E−01 | 3.1868E−02 | −1.3716E−02 | 2.8996E−03 | −4.3372E−04 | 4.6373E−05 |
| R13 | −1.0099E+00 | −5.9050E−02 | 1.0295E−02 | −1.2381E−03 | 8.8635E−05 | −3.5566E−07 |
| R14 | −9.9818E−01 | −6.9155E−02 | 1.6449E−02 | −3.4017E−03 | 5.5547E−04 | −6.9006E−05 |

| | Conic Coefficient | Aspheric Coefficient | | | | |
|---|---|---|---|---|---|---|
| | k | A14 | A16 | A18 | A20 | A22 |
| R1 | −1.1963E−02 | −3.7993E−04 | 5.2451E−05 | −3.9937E−06 | 1.2886E−07 | 0.0000E+00 |
| R2 | −2.8701E−01 | −3.7462E−04 | 5.5845E−05 | −4.6131E−06 | 1.6157E−07 | 0.0000E+00 |
| R3 | −5.0321E−01 | −2.6611E−04 | 3.6358E−05 | −2.5269E−06 | 6.3452E−08 | 0.0000E+00 |
| R4 | 6.1927E−01 | −1.7916E−03 | 3.5838E−04 | −4.0110E−05 | 1.9351E−06 | 0.0000E+00 |
| R5 | −1.1890E+00 | 2.3409E−04 | −2.7966E−05 | 6.9219E−07 | 1.0527E−07 | 0.0000E+00 |
| R6 | −3.5147E−02 | 1.6657E−03 | −3.1141E−04 | 3.1722E−05 | −1.3536E−06 | 0.0000E+00 |
| R7 | −1.8464E+00 | 1.9407E−04 | −4.3535E−05 | 4.6729E−06 | −1.9587E−07 | 0.0000E+00 |
| R8 | −9.9764E+01 | 7.8799E−05 | −9.8271E−06 | 6.2550E−07 | −1.4988E−08 | 0.0000E+00 |
| R9 | −5.8338E−01 | 4.5932E−04 | −5.8155E−05 | −5.6955E−06 | 3.6198E−06 | −6.7957E−07 |
| R10 | −6.4647E+00 | −2.2043E−04 | 2.8258E−05 | −2.2849E−06 | 9.9742E−08 | −3.2829E−10 |
| R11 | −5.9567E+00 | −1.6380E−05 | 1.4757E−06 | −7.9845E−08 | 2.1953E−09 | −5.5240E−12 |
| R12 | −8.9563E−01 | −3.1841E−06 | 7.1361E−08 | 1.1284E−08 | −1.4823E−09 | 9.2105E−11 |
| R13 | −1.0099E+00 | −6.5153E−07 | 7.4722E−08 | −4.6700E−09 | 1.8905E−10 | −5.1264E−12 |
| R14 | −9.9818E−01 | 6.3898E−06 | −4.3583E−07 | 2.1748E−08 | −7.8814E−10 | 2.0460E−11 |

| | Conic Coefficient | Aspheric Coefficient | | | | |
|---|---|---|---|---|---|---|
| | k | A24 | A26 | A28 | A30 | / |
| R1 | −1.1963E−02 | 0.0000E+00 | 0.0000E+00 | 0.0000E+00 | 0.0000E+00 | / |
| R2 | −2.8701E−01 | 0.0000E+00 | 0.0000E+00 | 0.0000E+00 | 0.0000E+00 | / |
| R3 | −5.0321E−01 | 0.0000E+00 | 0.0000E+00 | 0.0000E+00 | 0.0000E+00 | / |
| R4 | 6.1927E−01 | 0.0000E+00 | 0.0000E+00 | 0.0000E+00 | 0.0000E+00 | / |
| R5 | −1.1890E+00 | 0.0000E+00 | 0.0000E+00 | 0.0000E+00 | 0.0000E+00 | / |
| R6 | −3.5147E−02 | 0.0000E+00 | 0.0000E+00 | 0.0000E+00 | 0.0000E+00 | / |
| R7 | −1.8464E+00 | 0.0000E+00 | 0.0000E+00 | 0.0000E+00 | 0.0000E+00 | / |
| R8 | −9.9764E+01 | 0.0000E+00 | 0.0000E+00 | 0.0000E+00 | 0.0000E+00 | / |
| R9 | −5.8338E−01 | 7.1390E−08 | −4.4638E−09 | 1.5564E−10 | −2.3377E−12 | / |
| R10 | −6.4647E+00 | −2.1154E−10 | 1.1263E−11 | −2.5145E−13 | 2.1040E−15 | / |
| R11 | −5.9567E+00 | −1.0887E−12 | 4.7381E−15 | 7.9989E−16 | −1.3227E−17 | / |
| R12 | −8.9563E−01 | −3.4813E−12 | 8.1510E−14 | −1.0932E−15 | 6.4501E−18 | / |
| R13 | −1.0099E+00 | 9.1385E−14 | −9.9959E−16 | 5.6897E−18 | −1.0269E−20 | / |
| R14 | −9.9818E−01 | −3.7028E−13 | 4.4347E−15 | −3.1589E−17 | 1.0135E−19 | / |

Figure 26:
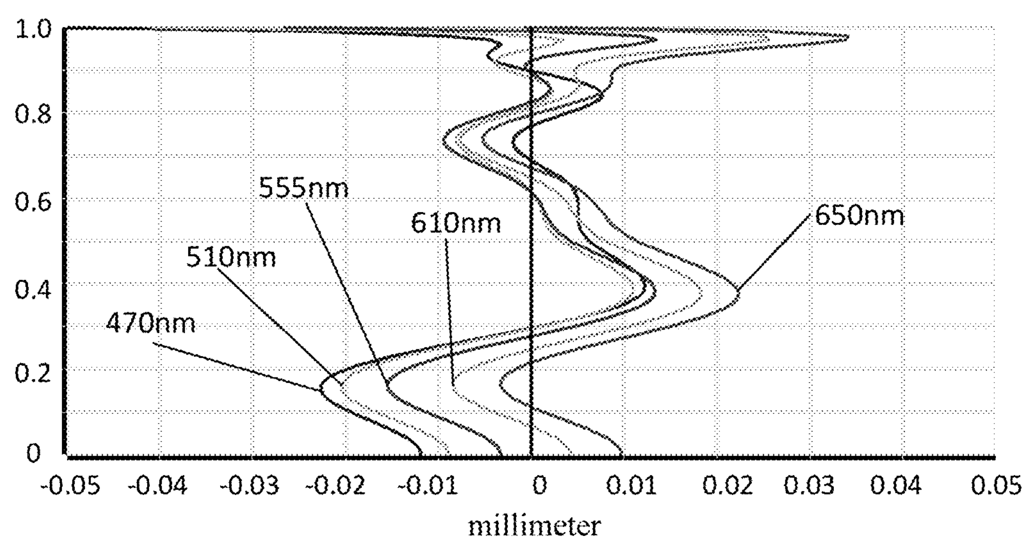
FIG. 26 is a schematic diagram of longitudinal aberration of the camera optical lens shown in FIG. 25.
Figure 27:
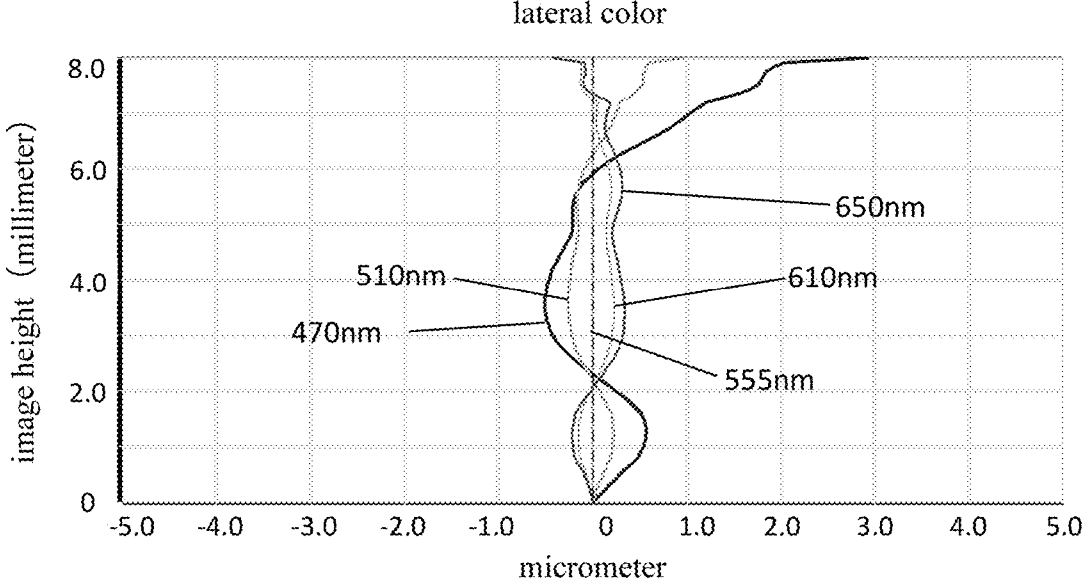
FIG. 27 is a schematic diagram of lateral color of the camera optical lens shown in FIG. 25.
Figure 28:
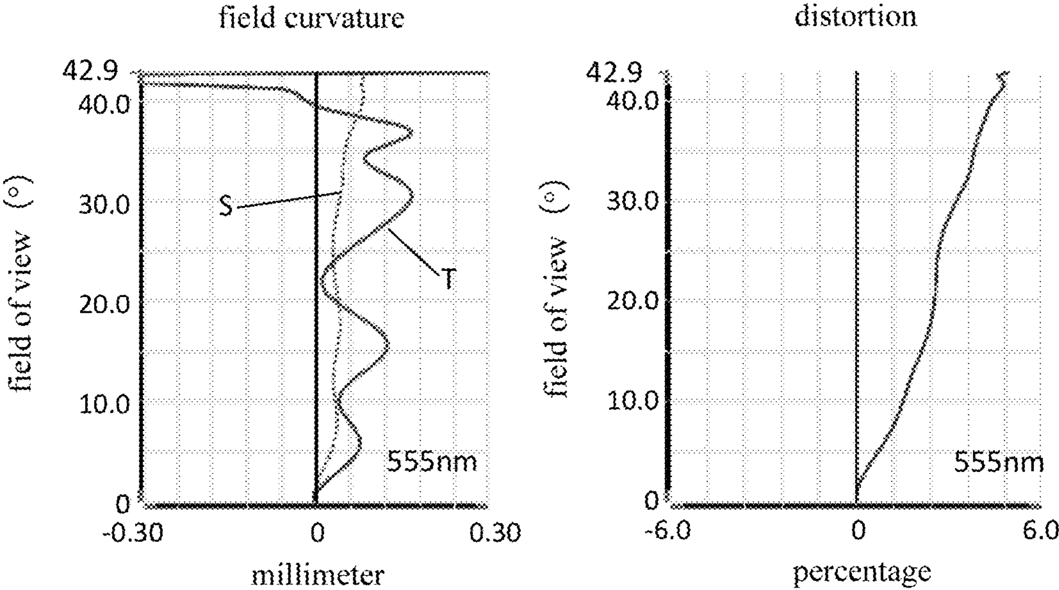
FIG. 28 is a schematic diagram of field curvature and distortion of the camera optical lens shown in FIG. 25.

FIG. 26 and FIG. 27 respectively show longitudinal aberration and lateral color of light with wavelengths of 650 nm, 610 nm, 555 nm, 510 nm, and 470 nm after passing through the camera optical lens 70 according to Embodiment 7. FIG. 28 shows field curvature and distortion of light with a wavelength of 555 nm after passing through the camera optical lens 70 according to Embodiment 7. The field curvature S in FIG. 28 is the field curvature in a sagittal direction, and T is the field curvature in a meridional direction.

In this embodiment, the entrance pupil diameter ENPD of the camera optical lens 70 is 4.973 mm, the full field of view (1.0 field of view) image height IH is 8.000 mm, the MIC field of view image height IH is 8.250 mm, the field of view FOV of the full field of view (1.0 field of view) in a diagonal direction is 85.80°, the field of view FOV of the MIC field of view in a diagonal direction is 88.17°, the camera optical lens 70 meets the design requirements of high relative illumination, wide angle, good processability, the on-axis and off-axis color aberrations are fully corrected. The camera optical lens 70 has excellent optical characteristics.

Embodiment 8

The meaning of the reference signs of Embodiment 8 is the same as that of Embodiment 1.

Figure 29:
FIG. 29 is a structural schematic diagram of a camera optical lens according to Embodiment 8 of the present disclosure.
Figure 29:
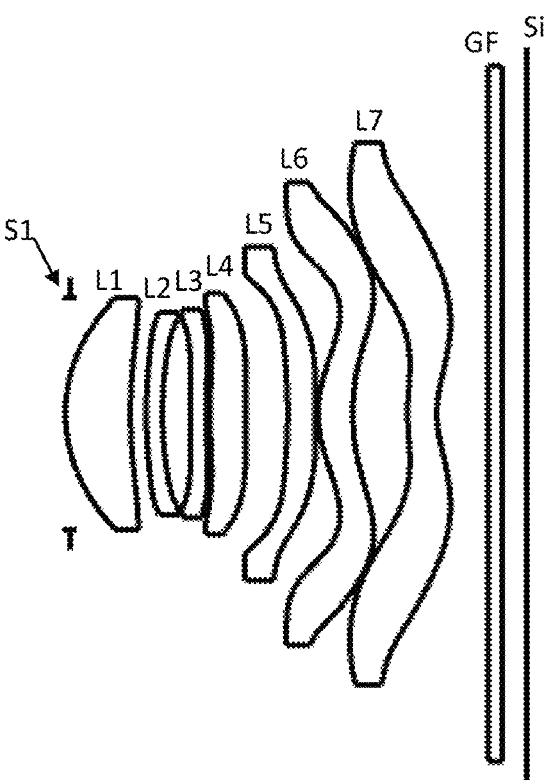

FIG. 29 shows a camera optical lens 80 according to Embodiment 8 of the present disclosure.

Table 15 and Table 16 show design data of the camera optical lens 80 according to Embodiment 8 of the present disclosure.

TABLE 15

| | R | | d | | nd | | vd |
|---|---|---|---|---|---|---|---|
| S1 | ∞ | d0= | −0.090 | | | | |
| R1 | 3.457 | d1= | 1.414 | nd1 | 1.4959 | v1 | 81.65 |
| R2 | 9.881 | d2= | 0.345 | | | | |
| R3 | 9.700 | d3= | 0.349 | nd2 | 1.6700 | v2 | 19.39 |
| R4 | 7.771 | d4= | 0.600 | | | | |
| R5 | 31.799 | d5= | 0.351 | nd3 | 1.6700 | v3 | 19.39 |
| R6 | 15.254 | d6= | 0.090 | | | | |
| R7 | 17.101 | d7= | 0.784 | nd4 | 1.5444 | v4 | 55.82 |
| R8 | −103.160 | d8= | 0.905 | | | | |
| R9 | −8.538 | d9= | 0.604 | nd5 | 1.5661 | v5 | 37.71 |
| R10 | 28.498 | d10= | 0.052 | | | | |
| R11 | 2.395 | d11= | 0.767 | nd6 | 1.5346 | v6 | 55.69 |
| R12 | 6.888 | d12= | 1.186 | | | | |
| R13 | 4.993 | d13= | 0.636 | nd7 | 1.5346 | v7 | 55.69 |
| R14 | 2.395 | d14= | 1.115 | | | | |
| R15 | ∞ | d15= | 0.310 | ndg | 1.5168 | vg | 64.17 |
| R16 | ∞ | d16= | 0.533 | | | | |

Table 16 shows aspherical surface data of each lens in the camera optical lens 80 according to Embodiment 8 of the present disclosure.

TABLE 16

| | Conic Coefficient | Aspheric Coefficient | | | | |
|---|---|---|---|---|---|---|
| | k | A4 | A6 | A8 | A10 | A12 |
| R1 | 0.0000E+00 | 2.8930E−03 | −6.7072E−03 | 7.2002E−03 | −4.4400E−03 | 1.6548E−03 |
| R2 | 0.0000E+00 | −6.9167E−04 | −6.1840E−03 | 6.3387E−03 | −3.9220E−03 | 1.5283E−03 |
| R3 | 0.0000E+00 | −5.3742E−03 | −4.1540E−03 | 5.1888E−03 | −2.9979E−03 | 1.1334E−03 |
| R4 | 0.0000E+00 | −1.2611E−03 | −8.6298E−03 | 1.2939E−02 | −1.0515E−02 | 5.4697E−03 |
| R5 | 0.0000E+00 | −5.3772E−03 | 1.6618E−05 | −2.9517E−03 | 2.2434E−03 | −9.6378E−04 |
| R6 | 0.0000E+00 | −1.4440E−03 | 3.8437E−05 | −9.2895E−03 | 9.7438E−03 | −5.2526E−03 |
| R7 | 0.0000E+00 | 2.4792E−03 | −1.1227E−02 | 4.7130E−03 | −6.0636E−04 | −3.3843E−04 |
| R8 | 0.0000E+00 | −9.9261E−04 | −2.9100E−03 | −5.3556E−04 | 8.5346E−04 | −3.5468E−04 |
| R9 | −1.0000E+00 | 2.6177E−02 | −1.1365E−02 | 6.4553E−04 | 2.3321E−03 | −1.5321E−03 |
| R10 | −1.0000E+00 | −3.3066E−02 | −4.9284E−04 | 6.5174E−03 | −3.6588E−03 | 1.1243E−03 |
| R11 | −6.0000E+00 | 5.0635E−03 | −5.3391E−03 | 1.7041E−03 | −5.2520E−04 | 1.1500E−04 |
| R12 | −1.0000E+00 | 3.1821E−02 | −1.3721E−02 | 2.8997E−03 | −4.3372E−04 | 4.6373E−05 |
| R13 | −1.0000E+00 | −5.9057E−02 | 1.0294E−02 | −1.2382E−03 | 8.8635E−05 | −3.5567E−07 |
| R14 | −1.0000E+00 | −6.9201E−02 | 1.6450E−02 | −3.4017E−03 | 5.5547E−04 | −6.9006E−05 |

| | Conic Coefficient | Aspheric Coefficient | | | | |
|---|---|---|---|---|---|---|
| | k | A14 | A16 | A18 | A20 | A22 |
| R1 | 0.0000E+00 | −3.7992E−04 | 5.2451E−05 | −3.9932E−06 | 1.2875E−07 | 0.0000E+00 |
| R2 | 0.0000E+00 | −3.7466E−04 | 5.5845E−05 | −4.6141E−06 | 1.6181E−07 | 0.0000E+00 |
| R3 | 0.0000E+00 | −2.6612E−04 | 3.6357E−05 | −2.5287E−06 | 6.3112E−08 | 0.0000E+00 |
| R4 | 0.0000E+00 | −1.7916E−03 | 3.5838E−04 | −4.0107E−05 | 1.9344E−06 | 0.0000E+00 |
| R5 | 0.0000E+00 | 2.3423E−04 | −2.7928E−05 | 6.8853E−07 | 1.0479E−07 | 0.0000E+00 |
| R6 | 0.0000E+00 | 1.6656E−03 | −3.1141E−04 | 3.1723E−05 | −1.3545E−06 | 0.0000E+00 |
| R7 | 0.0000E+00 | 1.9408E−04 | −4.3539E−05 | 4.6716E−06 | −1.9548E−07 | 0.0000E+00 |
| R8 | 0.0000E+00 | 7.8793E−05 | −9.8273E−06 | 6.2591E−07 | −1.4988E−08 | 0.0000E+00 |
| R9 | −1.0000E+00 | 4.5932E−04 | −5.8155E−05 | −5.6955E−06 | 3.6198E−06 | −6.7957E−07 |
| R10 | −1.0000E+00 | −2.2043E−04 | 2.8258E−05 | −2.2849E−06 | 9.9743E−08 | −3.2830E−10 |
| R11 | −6.0000E+00 | −1.6380E−05 | 1.4757E−06 | −7.9845E−08 | 2.1953E−09 | −5.5241E−12 |
| R12 | −1.0000E+00 | −3.1841E−06 | 7.1361E−08 | 1.1284E−08 | −1.4823E−09 | 9.2105E−11 |
| R13 | −1.0000E+00 | −6.5153E−07 | 7.4722E−08 | −4.6700E−09 | 1.8905E−10 | −5.1264E−12 |
| R14 | −1.0000E+00 | 6.3898E−06 | −4.3583E−07 | 2.1748E−08 | −7.8814E−10 | 2.0460E−11 |

| | Conic Coefficient | Aspheric Coefficient | | | | |
|---|---|---|---|---|---|---|
| | k | A24 | A26 | A28 | A30 | / |
| R1 | 0.0000E+00 | 0.0000E+00 | 0.0000E+00 | 0.0000E+00 | 0.0000E+00 | / |
| R2 | 0.0000E+00 | 0.0000E+00 | 0.0000E+00 | 0.0000E+00 | 0.0000E+00 | / |
| R3 | 0.0000E+00 | 0.0000E+00 | 0.0000E+00 | 0.0000E+00 | 0.0000E+00 | / |
| R4 | 0.0000E+00 | 0.0000E+00 | 0.0000E+00 | 0.0000E+00 | 0.0000E+00 | / |
| R5 | 0.0000E+00 | 0.0000E+00 | 0.0000E+00 | 0.0000E+00 | 0.0000E+00 | / |
| R6 | 0.0000E+00 | 0.0000E+00 | 0.0000E+00 | 0.0000E+00 | 0.0000E+00 | / |
| R7 | 0.0000E+00 | 0.0000E+00 | 0.0000E+00 | 0.0000E+00 | 0.0000E+00 | / |
| R8 | 0.0000E+00 | 0.0000E+00 | 0.0000E+00 | 0.0000E+00 | 0.0000E+00 | / |
| R9 | −1.0000E+00 | 7.1390E−08 | −4.4638E−09 | 1.5564E−10 | −2.3377E−12 | / |
| R10 | −1.0000E+00 | −2.1154E−10 | 1.1263E−11 | −2.5145E−13 | 2.1040E−15 | / |
| R11 | −6.0000E+00 | −1.0887E−12 | 4.7379E−15 | 7.9993E−16 | −1.3225E−17 | / |
| R12 | −1.0000E+00 | −3.4813E−12 | 8.1510E−14 | −1.0932E−15 | 6.4502E−18 | / |
| R13 | −1.0000E+00 | 9.1385E−14 | −9.9960E−16 | 5.6897E−18 | −1.0269E−20 | / |
| R14 | −1.0000E+00 | −3.7028E−13 | 4.4347E−15 | −3.1589E−17 | 1.0135E−19 | / |

Figure 30:
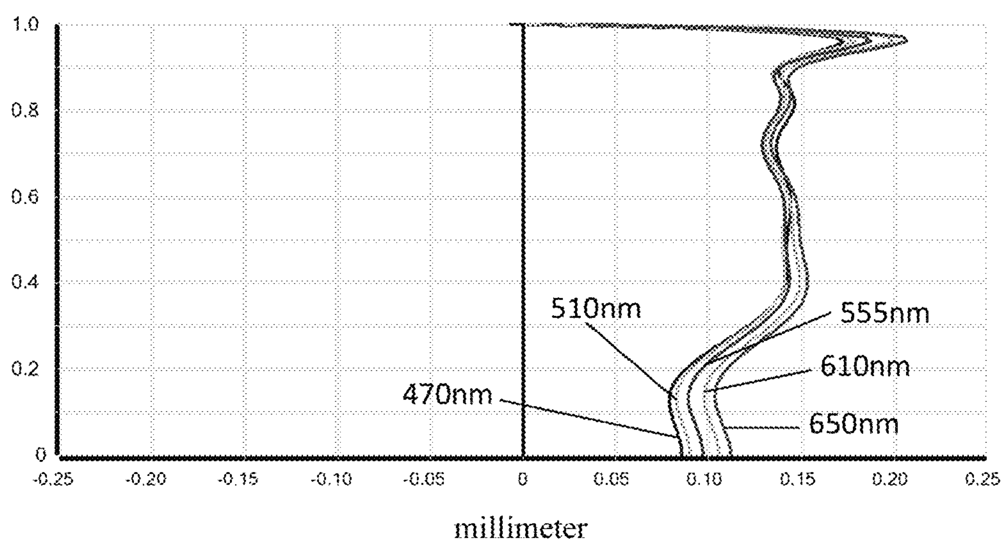
FIG. 30 is a schematic diagram of longitudinal aberration of the camera optical lens shown in FIG. 29.
Figure 31:
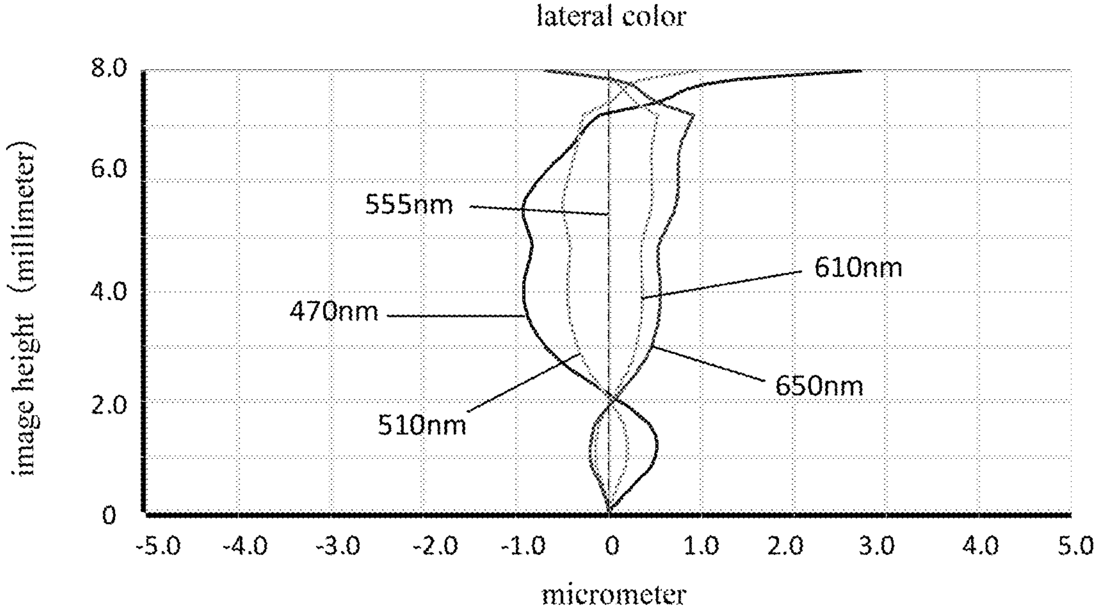
FIG. 31 is a schematic diagram of lateral color of the camera optical lens shown in FIG. 29.
Figure 32:
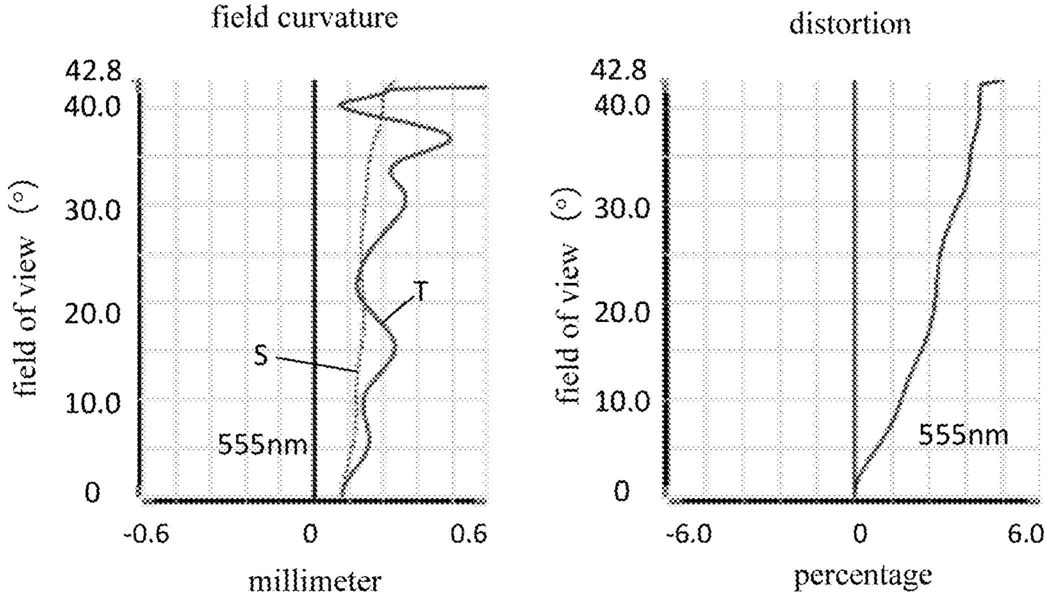
FIG. 32 is a schematic diagram of field curvature and distortion of the camera optical lens shown in FIG. 29.

FIG. 30 and FIG. 31 respectively show longitudinal aberration and lateral color of light with wavelengths of 650 nm, 610 nm, 555 nm, 510 nm, and 470 nm after passing through the camera optical lens 80 according to Embodiment 8. FIG. 32 shows field curvature and distortion of light with a wavelength of 555 nm after passing through the camera optical lens 80 according to Embodiment 8, the field curvature S in FIG. 32 is a field curvature in the sagittal direction, and T is a field curvature in the meridian direction.

In this embodiment, the entrance pupil diameter ENPD of the camera optical lens 80 is 5.136 mm, the full field of view (1.0 field of view) image height IH is 8.000 mm, the MIC field of view image height IH is 8.250 mm, the field of view FOV of the full field of view (1.0 field of view) in a diagonal direction is 85.58°, the field of view FOV of the MIC field of view in a diagonal direction is 87.71°, the camera optical lens 80 meets the design requirements of high relative illumination, wide angle, good processability, the on-axis and off-axis color aberrations are fully corrected. The camera optical lens 80 has excellent optical characteristics.

Table 17 appears later to show values of various values in Embodiment 1, Embodiment 2, Embodiment 3, Embodiment 4, Embodiment 5, Embodiment 6, Embodiment 7 and Embodiment 8 corresponding to parameters specified in the conditional formula.

TABLE 17

| Parameters and Relational Expressions | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|
| (SAG51/SD51*R9)/(SAG72/SD72*R14) | −6.39 | −4.81 | −4.67 | −5.32 | −4.11 | −5.13 | −7.00 | −5.39 |
| HC71/SD71 | 0.81 | 0.89 | 0.94 | 0.88 | 0.92 | 0.95 | 0.93 | 0.91 |
| HC72/SD72 | 0.89 | 0.94 | 0.96 | 0.91 | 0.91 | 0.97 | 0.93 | 0.94 |
| (d10 + d12)/d11 | 1.32 | 1.90 | 1.41 | 1.61 | 1.66 | 1.70 | 1.51 | 1.61 |
| d6/TTL | 0.009 | 0.010 | 0.008 | 0.009 | 0.012 | 0.010 | 0.009 | 0.009 |
| f6/f7 | −0.68 | −0.75 | −0.54 | −0.66 | −0.71 | −0.72 | −0.71 | −0.70 |
| (R1 + R2)/f | 1.55 | 1.59 | 1.58 | 1.68 | 1.61 | 1.21 | 1.79 | 1.57 |
| f1/(f2 − f3) | −0.43 | −0.67 | −0.48 | −0.73 | −0.59 | −0.07 | −0.62 | −0.54 |
| f12/f | 1.32 | 1.31 | 1.35 | 1.33 | 1.31 | 1.33 | 1.33 | 1.33 |
| f4/R7 + f5/R9 | 2.97 | 2.80 | 3.11 | 2.89 | 2.79 | 3.00 | 2.94 | 2.90 |
| \|TEP/SAG11\|*(f/f1) | 0.09 | 0.08 | 0.08 | 0.07 | 0.07 | 0.08 | 0.06 | 0.07 |
| f | 8.42 | 8.48 | 8.35 | 8.38 | 8.41 | 8.40 | 8.21 | 8.48 |
| f1 | 9.89 | 9.75 | 9.92 | 9.74 | 9.75 | 10.87 | 9.59 | 9.97 |
| f2 | −64.29 | −57.80 | −59.10 | −56.82 | −60.48 | −207.13 | −56.70 | −62.35 |
| f3 | −41.01 | −43.20 | −38.23 | −43.48 | −43.97 | −40.03 | −41.26 | −43.73 |
| f4 | 27.49 | 27.15 | 31.19 | 27.65 | 27.48 | 23.78 | 26.68 | 26.92 |
| f5 | −11.33 | −11.92 | −9.88 | −11.24 | −11.28 | −10.92 | −11.56 | −11.32 |
| f6 | 6.33 | 6.43 | 5.67 | 6.31 | 6.27 | 6.28 | 6.32 | 6.30 |
| f7 | −9.34 | −8.58 | −10.57 | −9.54 | −8.79 | −8.73 | −8.96 | −9.04 |
| TTL | 10.11 | 10.06 | 10.03 | 10.20 | 10.05 | 9.90 | 9.94 | 10.04 |
| FNO | 1.65 | 1.65 | 1.65 | 1.65 | 1.65 | 1.65 | 1.65 | 1.65 |
| IH(mm) | 8.000 | 8.000 | 8.000 | 8.000 | 8.000 | 8.000 | 8.000 | 8.000 |
| FOV(°) | 84.25 | 83.85 | 84.53 | 83.00 | 84.17 | 84.75 | 85.80 | 85.58 |

Those skilled in the art may understand that the above embodiments are specific embodiments for implementing the present disclosure, and in practical applications, various changes may be made in form and detail without departing from the spirit and scope of the present disclosure.

What is claimed is:

1. A camera optical lens, sequentially comprising seven lenses from an object side to an image side: a first lens having positive refractive power, a second lens having negative refractive power, a third lens having negative refractive power, a fourth lens having positive refractive power, a fifth lens having negative refractive power, a sixth lens having positive refractive power, and a seventh lens having negative refractive power, wherein the camera optical lens further comprises an aperture; an object-side surface of the first lens is convex in a paraxial region, an image-side surface of the first lens is concave in the paraxial region, an object-side surface of the second lens is convex in the paraxial region, an image-side surface of the second lens is concave in the paraxial region, an object-side surface of the third lens is convex in the paraxial region, an image-side surface of the third lens is concave in the paraxial region, an object-side surface of the fourth lens is convex in the paraxial region, an object-side surface of the fifth lens is concave in the paraxial region, an image-side surface of the fifth lens is concave in the paraxial region, an object-side surface of the sixth lens is convex in the paraxial region, an image-side surface of the sixth lens is concave in the paraxial region, an object-side surface of the seventh lens is convex in the paraxial region, an image-side surface of the seventh lens is concave in the paraxial region;

wherein a maximum optical radius of the object-side surface of the fifth lens is defined as SD51, a sagittal height at the maximum optical radius of the object-side surface of the fifth lens is defined as SAG51, a maximum optical radius of the image-side surface of the seventh lens is defined as SD72, a sagittal height at the maximum optical radius of the image-side surface of the seventh lens is defined as SAG72, a central curvature radius of the object-side surface of the fifth lens in the paraxial region is defined as R9, a central curvature radius of the image-side surface of the seventh lens in the paraxial region is defined as R14, a vertical height from the intersection point of the main light of the 1.0 field of view and the object-side surface of the seventh lens to the optical axis is defined as HC71, a maximum optical radius of the object-side surface of the seventh lens is defined as SD71, a vertical height from the intersection point of the main light of the 1.0 field of view and the image-side surface of the seventh lens to the optical axis is defined as HC72, a maximum optical radius of the image-side surface of the seventh lens is defined as SD72, an on-axis distance between the fifth lens and the sixth lens is d10, an on-axis distance between the sixth lens and the seventh lens is defined as d12, an on-axis thickness of the sixth lens is defined as d11, an on-axis distance between the third lens and the fourth lens is defined as d6, a total optical length from the object-side surface of the first lens to an image surface of the camera optical lens along an optic axis of the camera optical lens is defined as TTL, a focal length of the sixth lens is f6, a focal length of the seventh lens is defined as f7, a central curvature radius of the object-side surface of the first lens in the paraxial region is defined as R1, a central curvature radius of the image-side surface of the first lens in the paraxial region is defined as R2, a focal length of the camera optical lens is defined as f, and following relational expressions are satisfied:

$$-8.00 \le (SAG51/SD51*R9)/(SAG72/SD72*R14) \le -3.30;$$

$$0.80 \le HC71/SD71 \le 0.95;$$

$$0.85 \le HC72/SD72 \le 0.97;$$

$$1.10 \le (d10+d12)/d11 \le 2.10;$$

$$0.007 \le d6/TTL \le 0.013;$$

$$-0.85 \le f6/f7 \le -0.45; \text{ and}$$

$$1.00 \le (R1+R2)/f \le 2.10.$$

2. The camera optical lens as described in claim 1, wherein a distance along the optical axis from the aperture to the center of the object-side surface of the first lens is defined as TEP, a sagittal height at the maximum optical radius of the object-side surface of the first lens is defined as SAG11, a focal length of the first lens is defined as f1, and a following relational expression is satisfied: 0.06≤|TEP/SAG11|*(f/f1)≤0.09.

3. The camera optical lens as described in claim 1, wherein a following relational expression is satisfied: −7.10≤(SAG51/SD51*R9)/(SAG72/SD72*R14)≤−4.05.

4. The camera optical lens as described in claim 1, wherein a following relational expression is satisfied: 1.30≤(d10+d12)/d11≤1.91.

5. The camera optical lens as described in claim 1, wherein a following relational expression is satisfied: −0.76≤f6/f73-0.52.

6. The camera optical lens as described in claim 1, wherein a following relational expression is satisfied: 1.15≤(R1+R2)/f≤1.85.

7. The camera optical lens as described in claim 1, wherein an on-axis distance between the first lens and the second lens is defined as d2, an on-axis distance between the fourth lens and the fifth lens is defined as d8, and a following relational expression is satisfied:

$$1.95 \le d8/d2 \le 4.05.$$

8. The camera optical lens as described in claim 7, wherein a following relational expression is satisfied: 2.44≤d8/d2≤3.40.

9. The camera optical lens as described in claim 1, wherein the first lens is made of glass.

10. A lens assembly, comprising the camera optical lens as described in claim 1, wherein each of the first lens, the second lens, the third lens, the fourth lens, the fifth lens, the sixth lens and seventh lens comprises an optical portion for imaging and a structural portion surrounding the optical portion, the second lens comprises a second optical portion for imaging and a second structural portion surrounding the second optical portion, the third lens comprises a third optical portion for imaging and a third structural portion surrounding the third optical portion, the second structural portion comprises a first surface adjacent to an image side, the third structural portion comprises a second surface adjacent to an object side, the first surface comprises a first inclination surface adjacent to the second optical portion and a second inclination surface provided on a side of the first inclination surface away from the second optical portion, the second surface comprises a third inclination surface adjacent to the third optical portion and a fourth inclination surface provided on a side of the third inclination surface away from the third optical portion, an angle between the first inclination surface and an optical axis is defined as ANG1, an angle between the fourth inclination surface and the optical axis is defined as ANG4, and a following relational expression is satisfied: |ANG1-ANG4|≤30°.

11. The lens assembly as described in claim 10, wherein an angle between the second inclination surface and the optical axis is defined as ANG2, an angle between the third inclination surface and the optical axis is defined as ANG3, and a following relational expression is satisfied: |ANG2−ANG3|≤10°.

12. The lens assembly as described in claim 10, wherein the first inclination surface is inclined from inside to outside in a direction adjacent to the object side, a curvature radius of the image-side surface of the second lens in the paraxial region is defined as R4, a maximum optical radius of the image-side surface of the second lens is defined as SD22, and a following relational expression is satisfied: 3.00≤R4/SD22*tan (ANG1)≤5.00.

13. The lens assembly as described in claim 11, wherein the third inclination surface is inclined from inside to outside in a direction adjacent to the image side, a curvature radius of the object-side surface of the third lens in the paraxial region is defined as R5, a maximum optical radius of the object-side surface of the third lens is defined as SD31, and a following relational expression is satisfied: 1.50≤R5/SD31*cos (ANG3)≤4.00.

14. A camera optical lens, sequentially comprising seven lenses from an object side to an image side: a first lens having positive refractive power, a second lens having negative refractive power, a third lens having negative refractive power, a fourth lens having positive refractive power, a fifth lens having negative refractive power, a sixth lens having positive refractive power, a seventh lens having negative refractive power, and the camera optical lens further comprises an aperture; an object-side surface of the first lens is convex in the paraxial region, an image-side surface of the first lens is concave in the paraxial region, an object-side surface of the second lens is convex in the paraxial region, an image-side surface of the second lens is concave in the paraxial region, an object-side surface of the third lens is convex in the paraxial region, an image-side surface of the third lens is concave in the paraxial region, an object-side surface of the fourth lens is convex in the paraxial region, an object-side surface of the fifth lens is concave in the paraxial region, an image-side surface of the fifth lens is concave in the paraxial region, an object-side surface of the sixth lens is convex in the paraxial region, an image-side surface of the sixth lens is concave in the paraxial region, an object-side surface of the seventh lens is convex in the paraxial region, an image-side surface of the seventh lens is concave in the paraxial;

wherein a maximum optical radius of the object-side surface of the fifth lens is defined as SD51, a sagittal height at the maximum optical radius of the object-side surface of the fifth lens is defined as SAG51, a maximum optical radius of the image-side surface of the seventh lens is defined as SD72, a sagittal height at the maximum optical radius of the image-side surface of the seventh lens is defined as SAG72, a central curvature radius of the object-side surface of the fourth lens in the paraxial region is defined as R7, a central curvature radius of the object-side surface of the fifth lens in the paraxial region is defined as R9, a central curvature radius of the image-side surface of the seventh lens in the paraxial region is defined as R14, a vertical height from the intersection point of the main light of the 1.0 field of view and the object-side surface of the seventh lens to the optical axis is defined as HC71, a maximum optical radius of the object-side surface of the seventh lens is defined as SD71, a vertical height from the intersection point of the main light of the 1.0 field of view and the image-side surface of the seventh lens to the optical axis is defined as HC72, a maximum optical radius of the image-side surface of the seventh lens is defined as SD72, an on-axis distance between the fifth lens and the sixth lens is defined as d10, an on-axis distance between the sixth lens and the seventh lens is d12, an on-axis thickness of the sixth lens is defined as d11, a focal length of the first lens is defined as f1, a focal length of the second lens is defined as f2, a focal length of the third lens is defined as f3, a focal length of the fourth lens is defined as f4, a focal length of the fifth lens is defined as f5, a focal length of the camera optical lens is defined as f, a combined focal length of the first lens and the second lens is defined as f12, and following relational expressions are satisfied:

$$-8.00 \leq (SAG51/SD51*R9)/(SAG72/SD72*R14) \leq -3.30;$$

$$0.80 \leq HC71/SD71 \leq 0.95;$$

$$0.85 \leq HC72/SD72 \leq 0.97;$$

$$1.10 \leq (d10+d12)/d11 \leq 2.10;$$

$$-0.88 \leq f1/(f2-f3) \leq -0.05;$$

$$1.10 \leq f12/f \leq 1.60; \text{ and}$$

$$2.20 \leq f4/R7+f5/R9 \leq 3.80.$$

15. The camera optical lens as described in claim 14, wherein a following relational expression is satisfied: $-0.75 \leq f1/(f2-f3) \leq -0.06$.

16. The camera optical lens as described in claim 14, wherein a following relational expression is satisfied: $1.28 \leq f12/f \leq 1.36$.

17. The camera optical lens as described in claim 14, wherein a following relational expression is satisfied: $2.70 \leq f4/R7+f5/R9 \leq 3.20$.

18. The camera optical lens as described in claim 14, wherein a following relational expression is satisfied: $-7.10 \leq (SAG51/SD51*R9)/(SAG72/SD72*R14) \leq -4.05$.

19. The camera optical lens as described in claim 14, wherein a following relational expression is satisfied: $1.30 \leq (d10+d12)/d11 \leq 1.91$.

20. The camera optical lens as described in claim 14, wherein a focal length of the sixth lens is defined as f6, a focal length of the seventh lens is defined as f7, and a following relational expression is satisfied: $-0.85 \leq f6/f7 \leq -0.45$.

21. The camera optical lens as described in claim 20, wherein a following relational expression is satisfied: $-0.76 \leq f6/f7 \leq -0.52$.

22. The camera optical lens as described in claim 14, wherein a central curvature radius of the object-side surface of the first lens in the paraxial region is defined as R1, a central curvature radius of the image-side surface of the first lens in the paraxial region is defined as R2, a focal length of the camera optical lens is defined as f, and a following relational expression is satisfied:

$$1.00 \leq (R1+R2)/f \leq 2.10.$$

23. The camera optical lens as described in claim 22, wherein a following relational expression is satisfied: $1.15 \leq (R1+R2)/f \leq 1.85$.

24. The camera optical lens as described in claim 14, wherein a focal length of the sixth lens is f6, and a following relational expression is satisfied: $1.65 \leq |f/f5|+|f/f6| \leq 2.69$.

25. The camera optical lens as described in claim 24, wherein a following relational expression is satisfied: $1.96 \leq |f/f5|+|f/f6| \leq 2.28$.

26. The camera optical lens as described in claim 14, wherein the first lens is made of glass.

27. A lens assembly, comprising the camera optical lens as described in claim 14, wherein each of the first lens, the second lens, the third lens, the fourth lens, the fifth lens, the sixth lens and seventh lens comprises an optical portion for imaging and a structural portion surrounding the optical portion, the second lens comprises a second optical portion for imaging and a second structural portion surrounding the second optical portion, the third lens comprises a third optical portion for imaging and a third structural portion surrounding the third optical portion, the second structural portion comprises a first surface adjacent to an image side, the third structural portion comprises a second surface adjacent to an object side, the first surface comprises a first inclination surface adjacent to the second optical portion and a second inclination surface provided on a side of the first inclination surface away from the second optical portion, the second surface comprises a third inclination surface adjacent to the third optical portion and a fourth inclination surface provided on a side of the third inclination surface away from the third optical portion, an angle between the first inclination surface and an optical axis is defined as ANG1, an angle between the fourth inclination surface and the optical axis is defined as ANG4, and a following relational expression is satisfied: $|ANG1-ANG4| \leq 30°$.

28. The lens assembly as described in claim 27, wherein an angle between the second inclination surface and the optical axis is defined as ANG2, an angle between the third inclination surface and the optical axis is defined as ANG3, and a following relational expression is satisfied: $|ANG2-ANG3| \leq 10°$.

29. The lens assembly as described in claim 27, wherein the first inclination surface is inclined from inside to outside in a direction adjacent to the object side, a curvature radius of the image-side surface of the second lens in the paraxial region is defined as R4, a maximum optical radius of the image-side surface of the second lens is defined as SD22, and a following relational expression is satisfied: $3.00 \leq R4/SD22*\tan(ANG1) \leq 5.00$.

30. The lens assembly as described in claim 28, wherein the third inclination surface is inclined from inside to outside in a direction adjacent to the image side, a curvature radius of the object-side surface of the third lens in the paraxial region is defined as R5, a maximum optical radius of the object-side surface of the third lens is defined as SD31, and a following relational expression is satisfied: $1.50 \leq R5/SD31*\cos(ANG3) \leq 4.00$.

* * * * *